(12) United States Patent
Ichimura et al.

(10) Patent No.: US 7,350,823 B2
(45) Date of Patent: Apr. 1, 2008

(54) DOUBLE PIPE FORKED PART STRUCTURE AND METHOD OF MAKING THE SAME

(75) Inventors: Nobuo Ichimura, Gunma (JP);
Yoshikazu Takamatsu, Sano (JP);
Susumu Sato, Gunma (JP)

(73) Assignee: Calsonic Kansei Corporation, Tokyo (JP)

( * ) Notice: Subject to any disclaimer, the term of this patent is extended or adjusted under 35 U.S.C. 154(b) by 219 days.

(21) Appl. No.: 11/075,044

(22) Filed: Mar. 9, 2005

(65) Prior Publication Data

US 2005/0200121 A1    Sep. 15, 2005

(30) Foreign Application Priority Data

Mar. 10, 2004  (JP)  ............................. 2004-068202
Mar. 10, 2004  (JP)  ............................. 2004-068203

(51) Int. Cl.
*F16L 39/00*    (2006.01)

(52) U.S. Cl. ................ 285/132.1; 285/122.1; 285/123.3; 29/890.036

(58) Field of Classification Search .......... 285/132.1, 285/131.1, 133.6, 133.3, 122.1, 123.16, 123.15, 285/123.3; 138/114, 117, 155; 29/890.035, 29/890.036, 890.038, 890.04
See application file for complete search history.

(56) References Cited

U.S. PATENT DOCUMENTS

| | | | | |
|---|---|---|---|---|
| 2,479,578 A | * | 8/1949 | Langvand | ................ 285/132.1 |
| 3,448,739 A | * | 6/1969 | Raible et al. | ................ 600/435 |
| 3,602,228 A | * | 8/1971 | Cowley | ................ 604/103 |
| 4,131,007 A | * | 12/1978 | Laundy | ................ 72/348 |
| 4,521,038 A | * | 6/1985 | Cerny | ................ 285/24 |
| 4,621,494 A | * | 11/1986 | Fujita | ................ 60/313 |
| 5,134,852 A | * | 8/1992 | Weeks | ................ 60/323 |
| 5,148,597 A | * | 9/1992 | Weeks | ................ 29/890.08 |
| 5,216,883 A | * | 6/1993 | Flugger | ................ 60/313 |
| 6,167,622 B1 | * | 1/2001 | Cwik | ................ 29/890.144 |
| 6,390,137 B1 | * | 5/2002 | Ewald et al. | ................ 138/114 |
| 7,152,885 B2 | * | 12/2006 | Takamatsu et al. | ....... 285/124.1 |

FOREIGN PATENT DOCUMENTS

JP    58-121394 A    7/1983

* cited by examiner

*Primary Examiner*—David Bochna
(74) *Attorney, Agent, or Firm*—Foley & Lardner LLP

(57) ABSTRACT

A forked part structure of a double pipe has an outer pipe, an inner pipe, a branch pipe and an open end portion of the outer pipe. The open end portion of the outer pipe has a substantially tubular inner pipe supporting portion to which the inner pipe is brazed, and a substantially tubular branch pipe supporting portion to which the branch pipe is brazed. The inner pipe supporting portion is located inward of a main portion of the outer pipe along an extending direction of the main portion of the outer pipe.

20 Claims, 39 Drawing Sheets

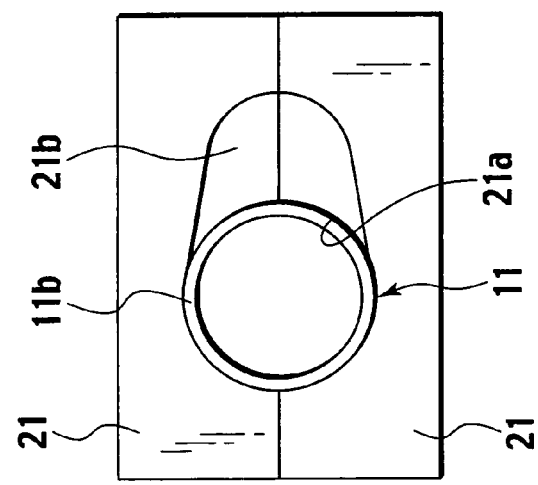
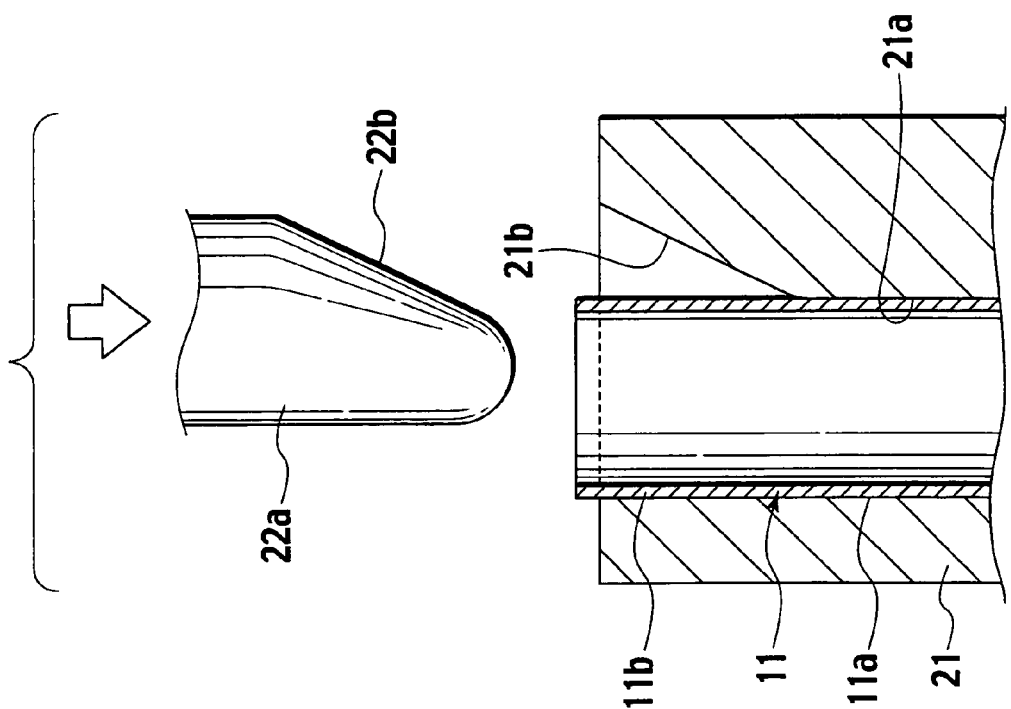

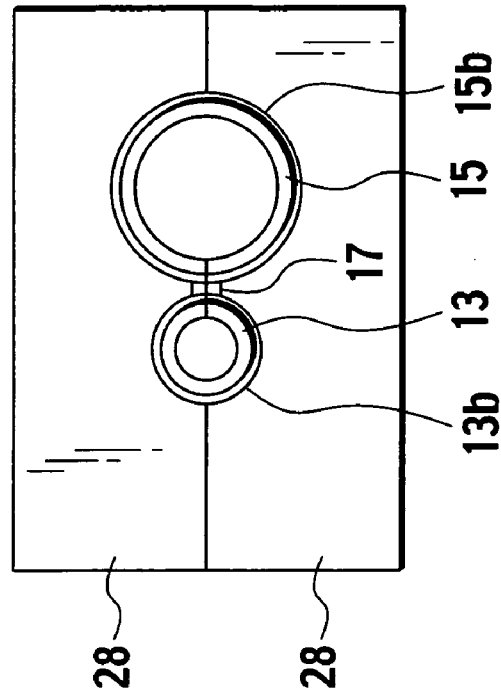
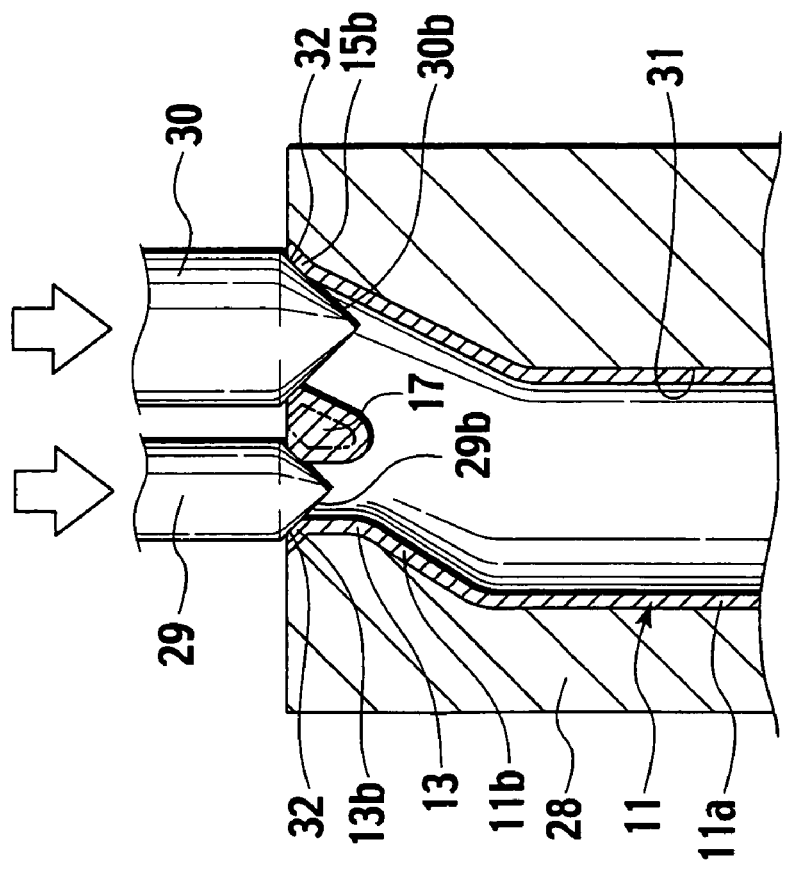
FIG.7A
FIG.7B

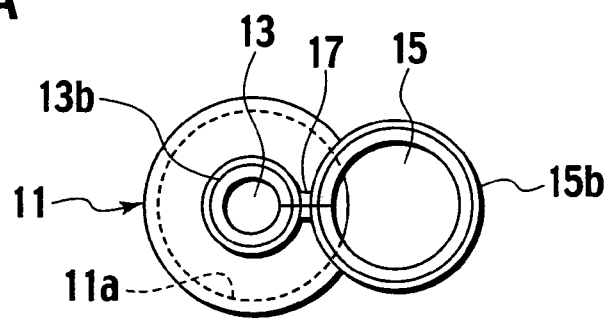
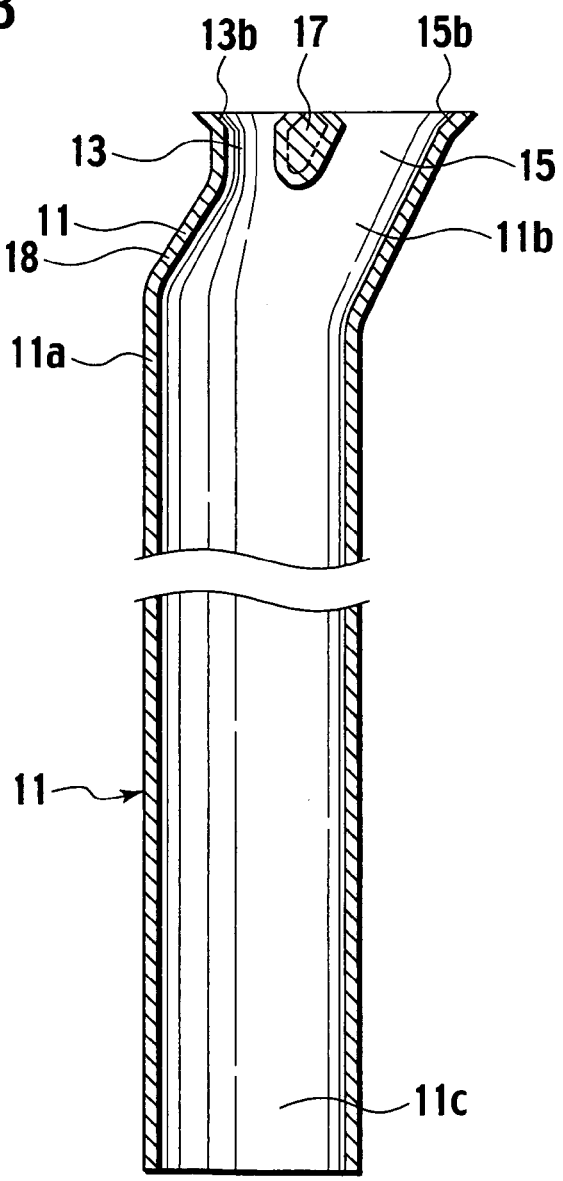

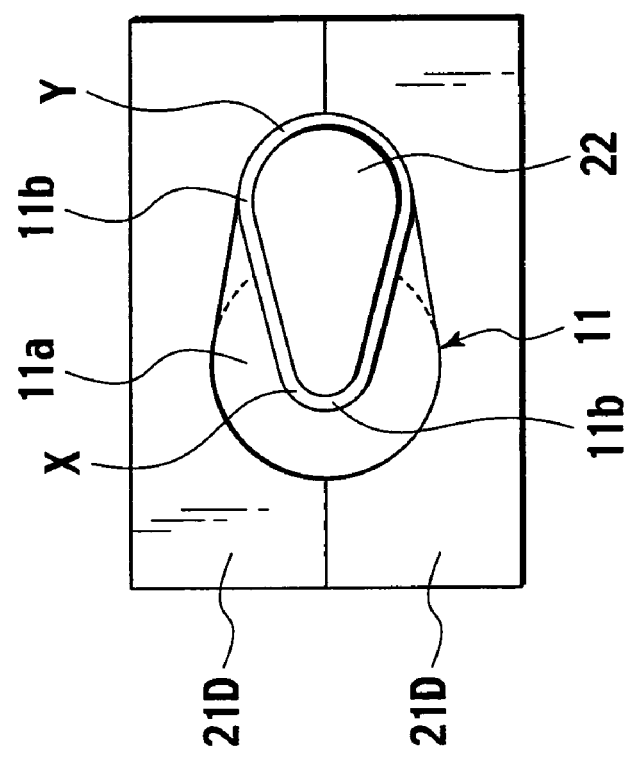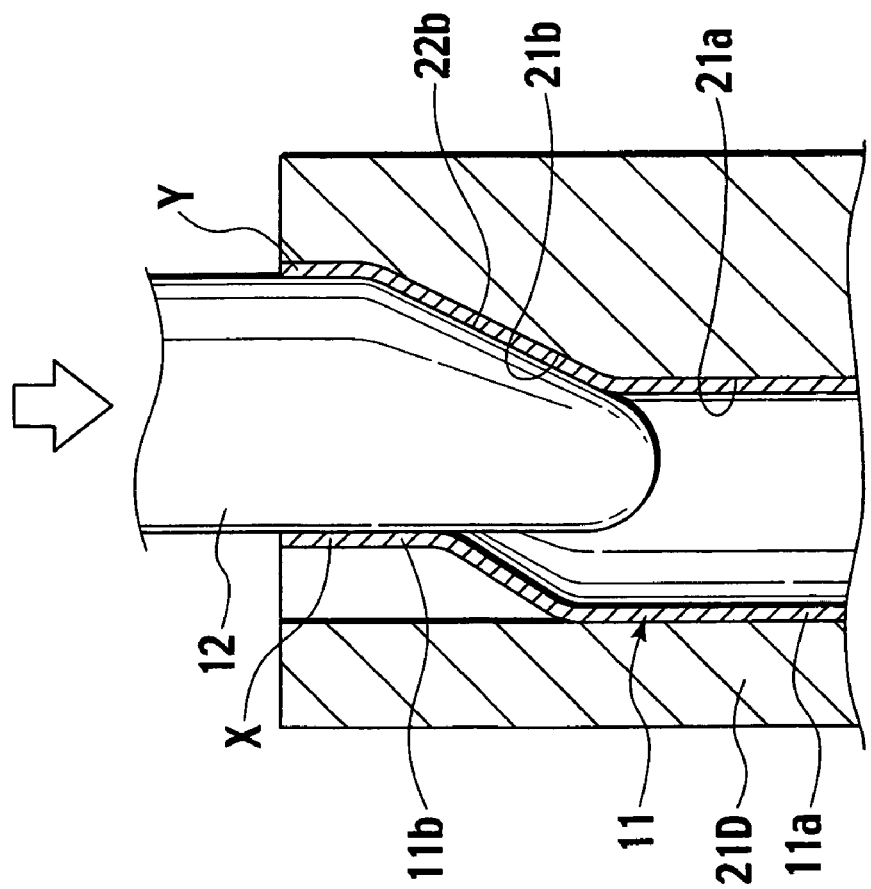

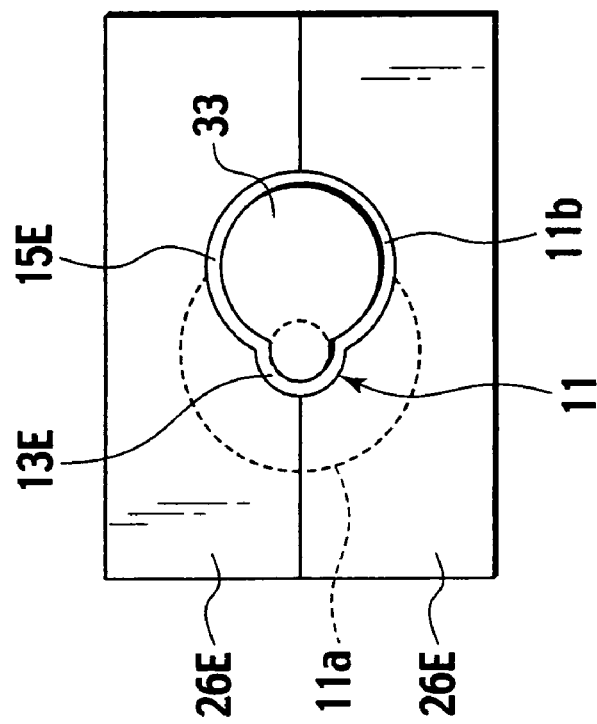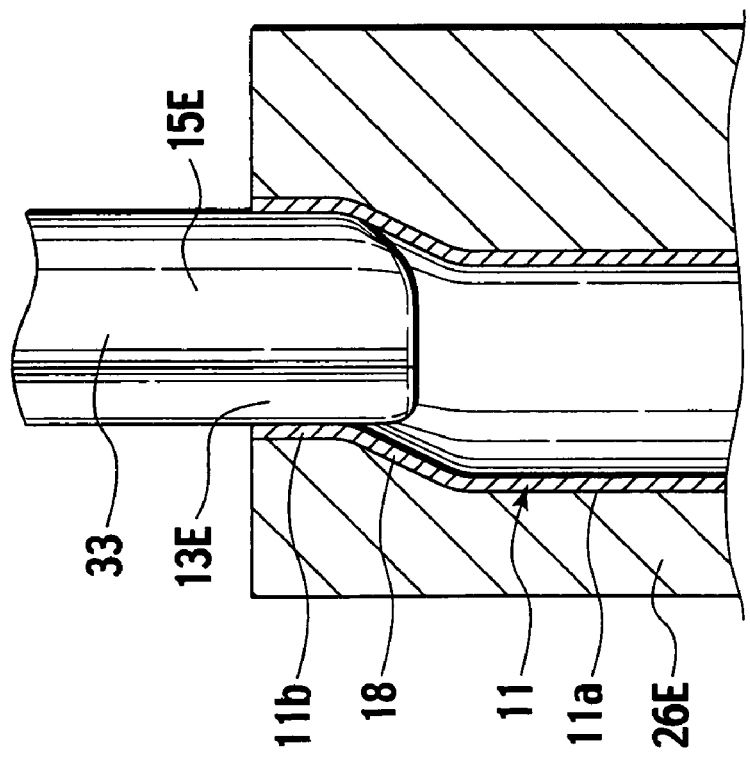
FIG.19A
FIG.19B

FIG.20A
FIG.20B
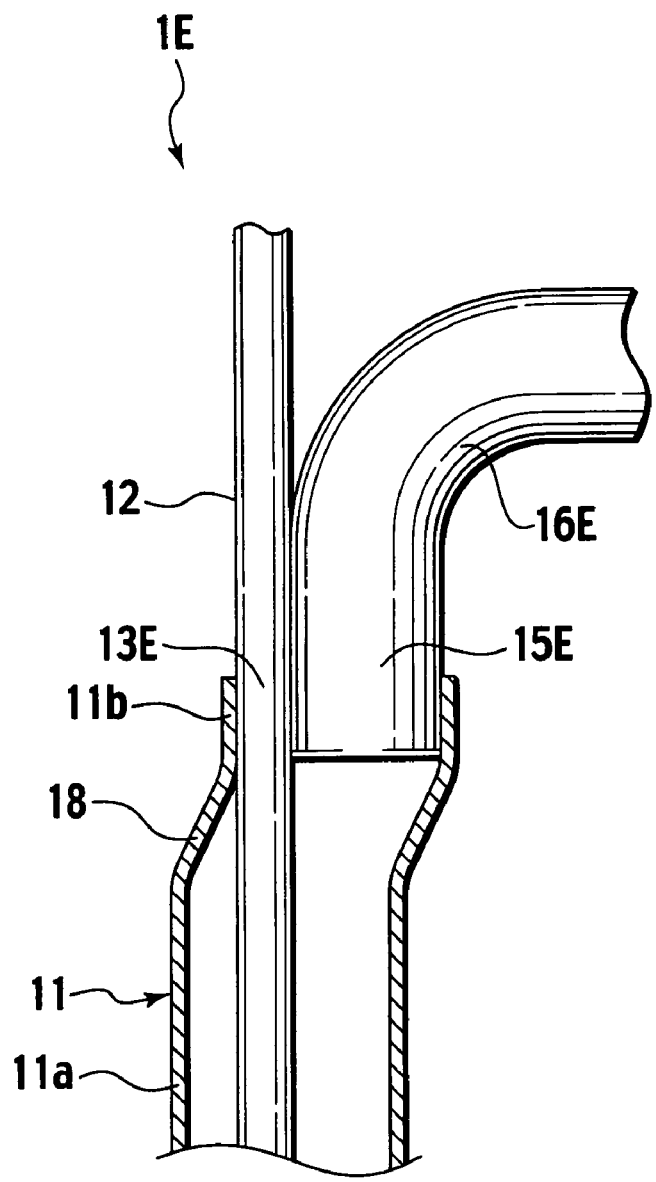
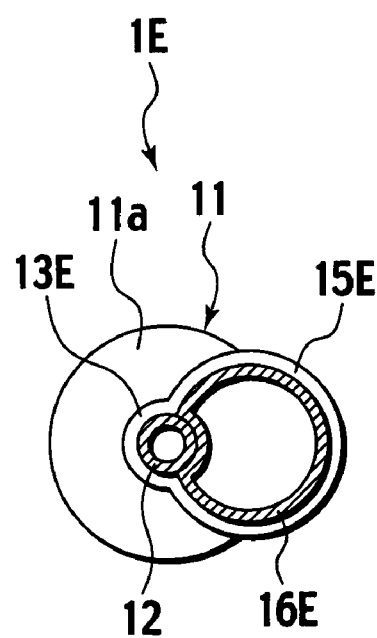

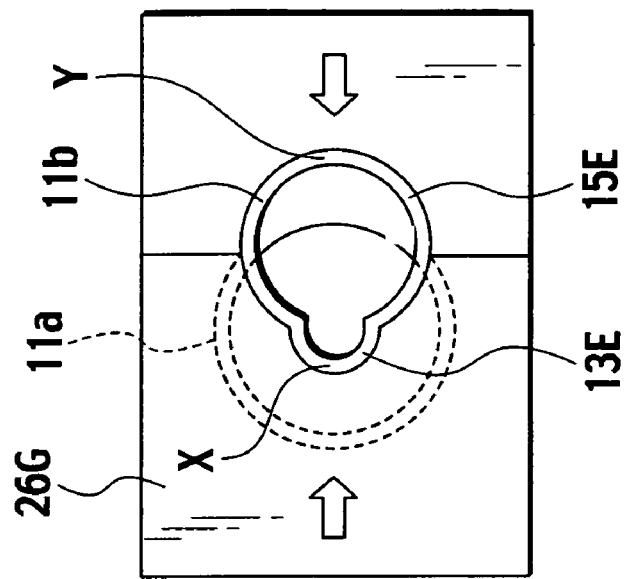
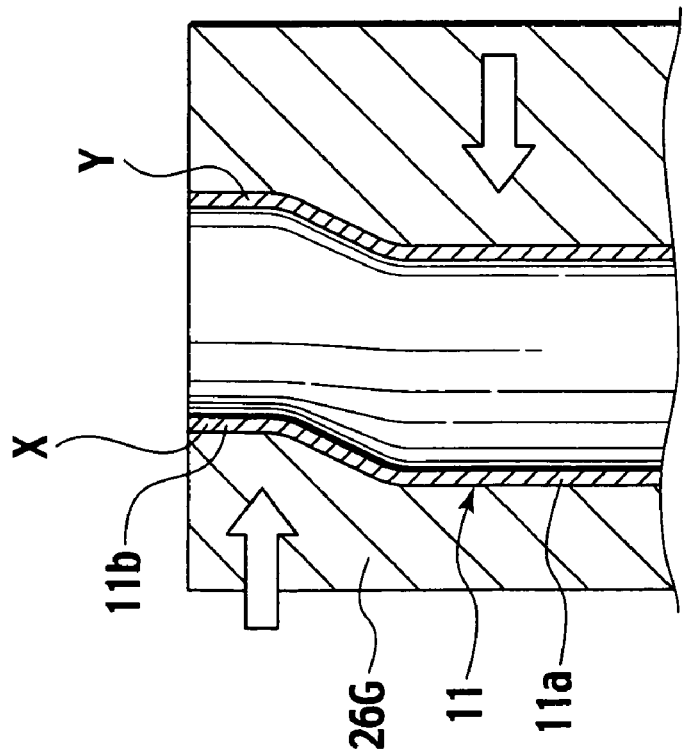

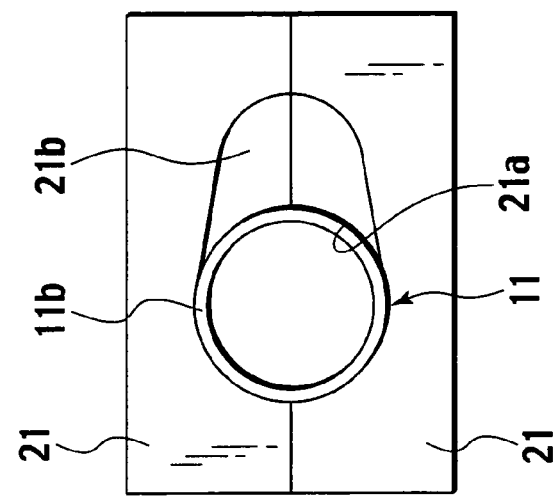
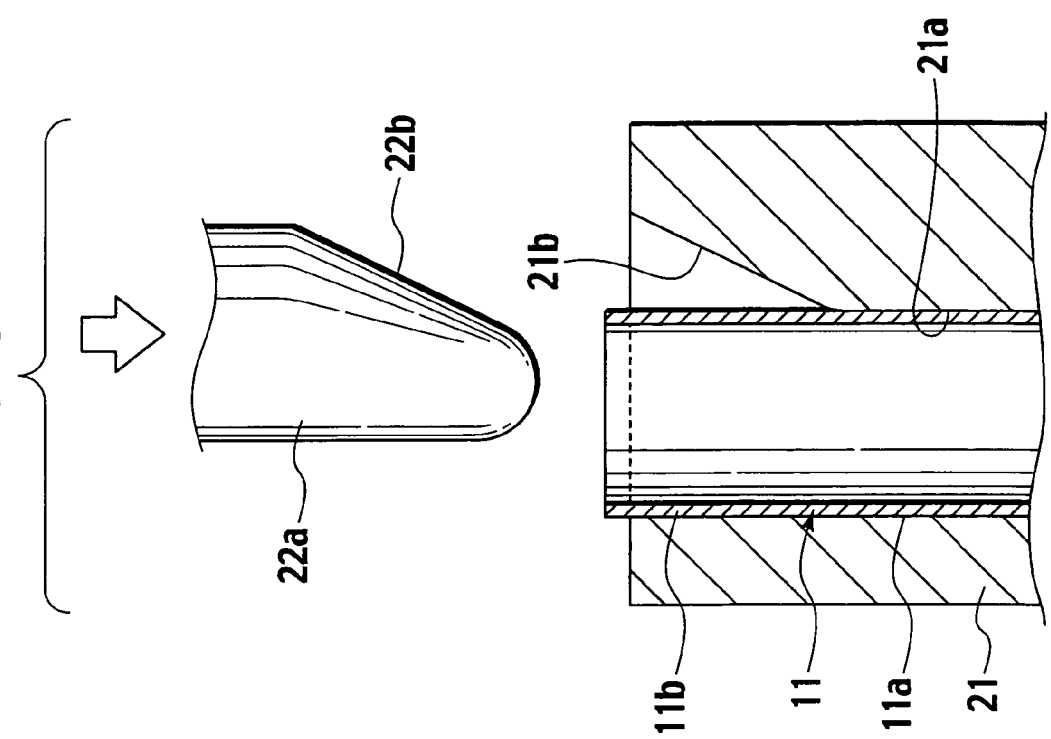

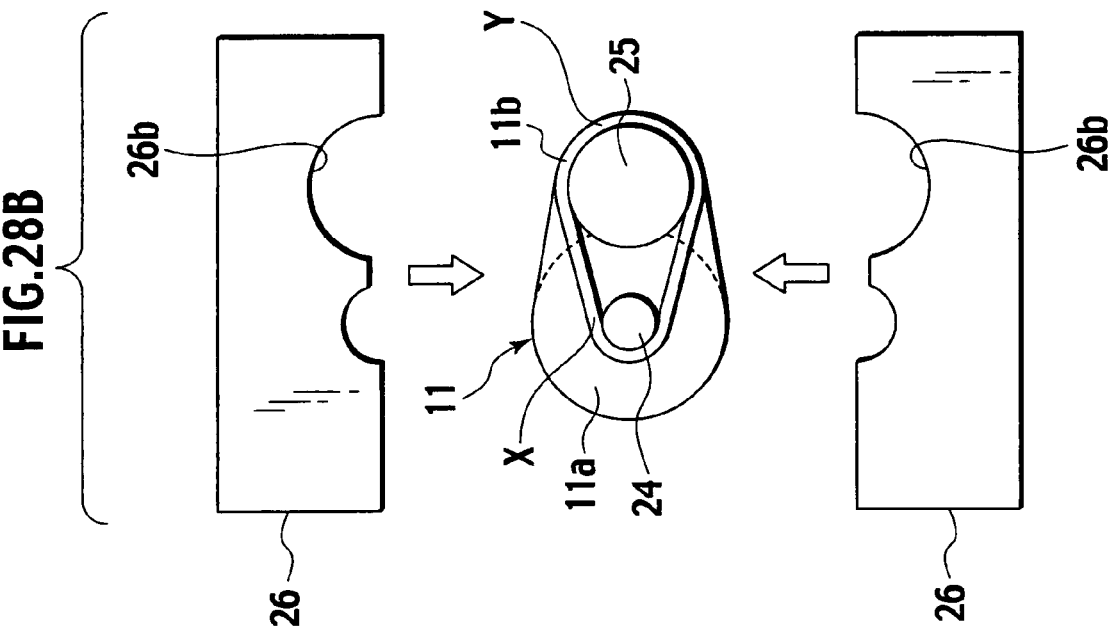
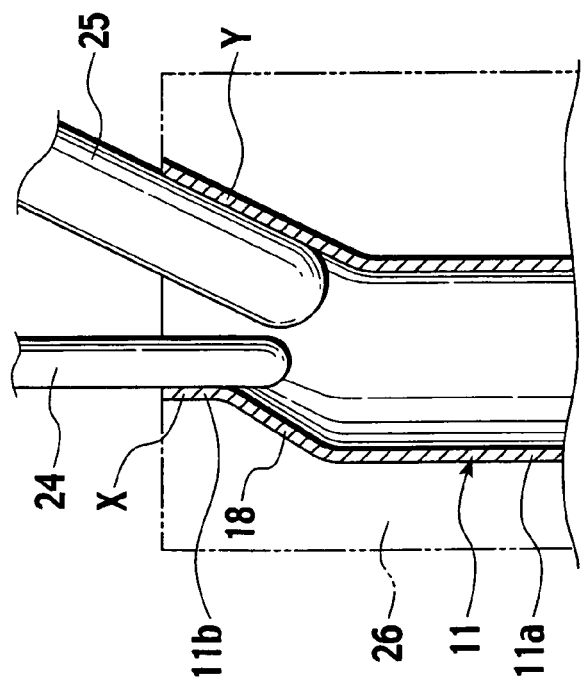

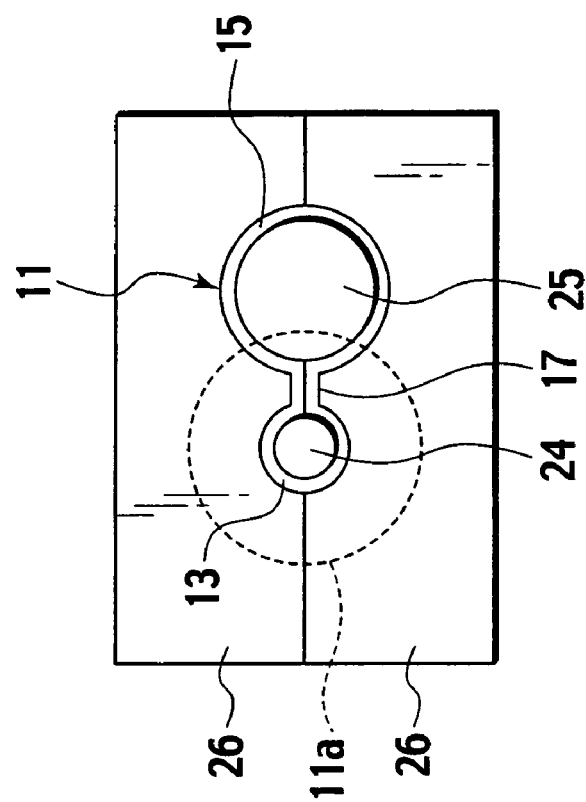
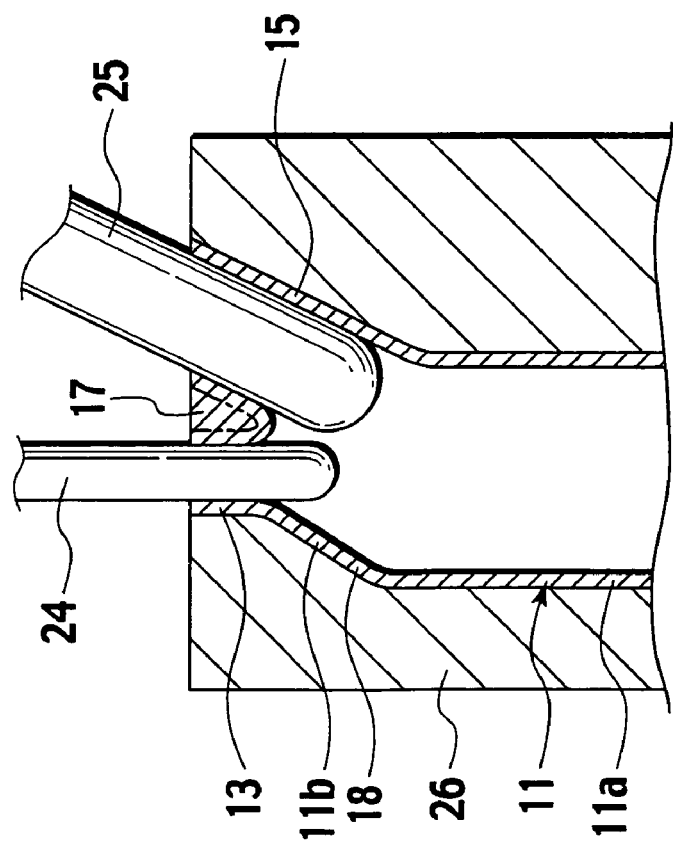
FIG.29A
FIG.29B

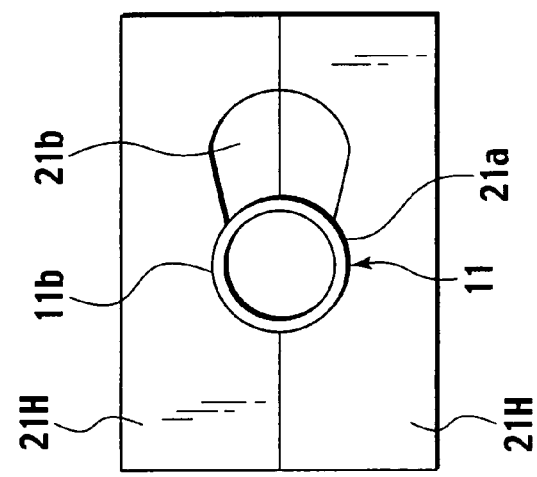
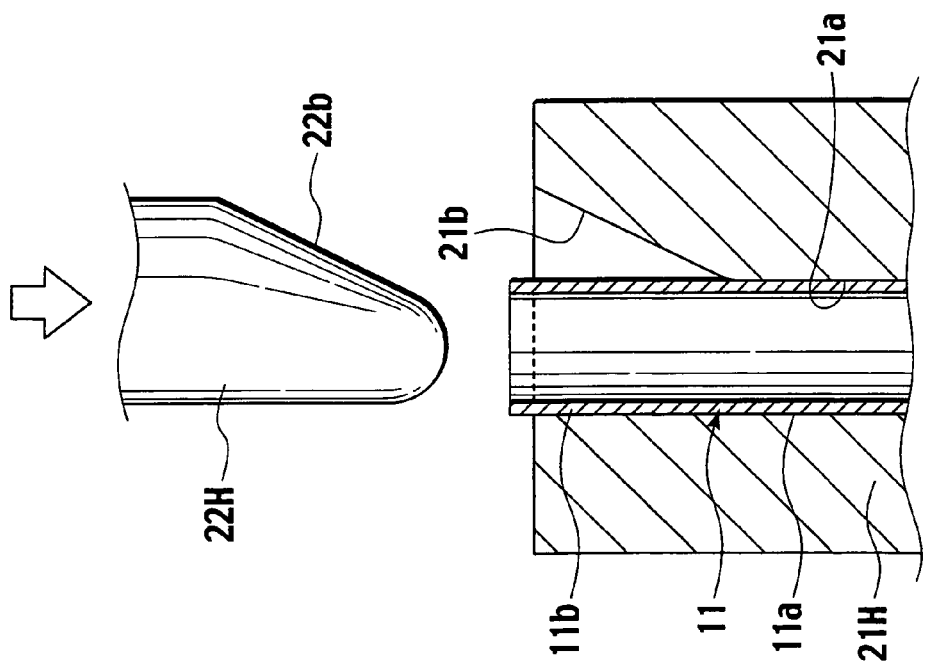

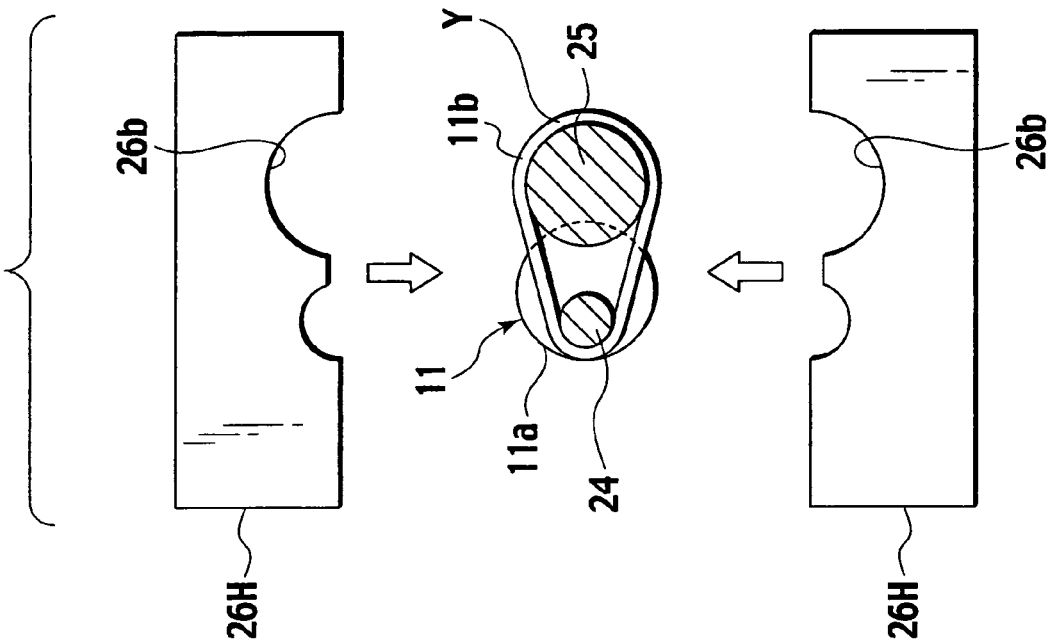
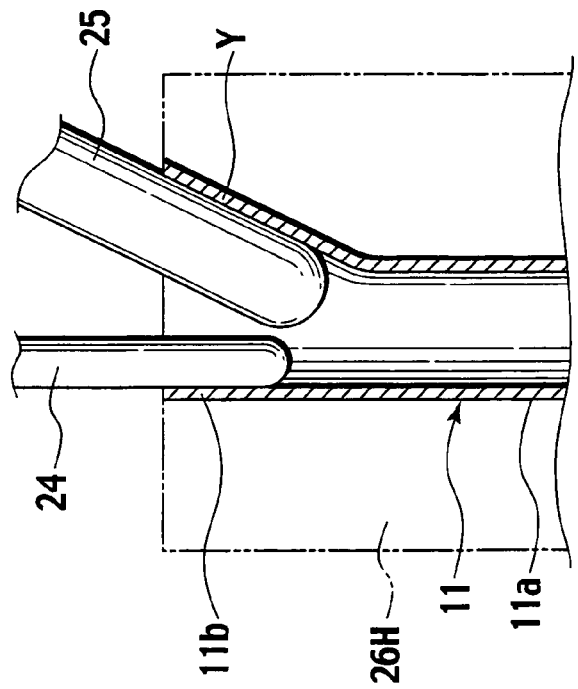

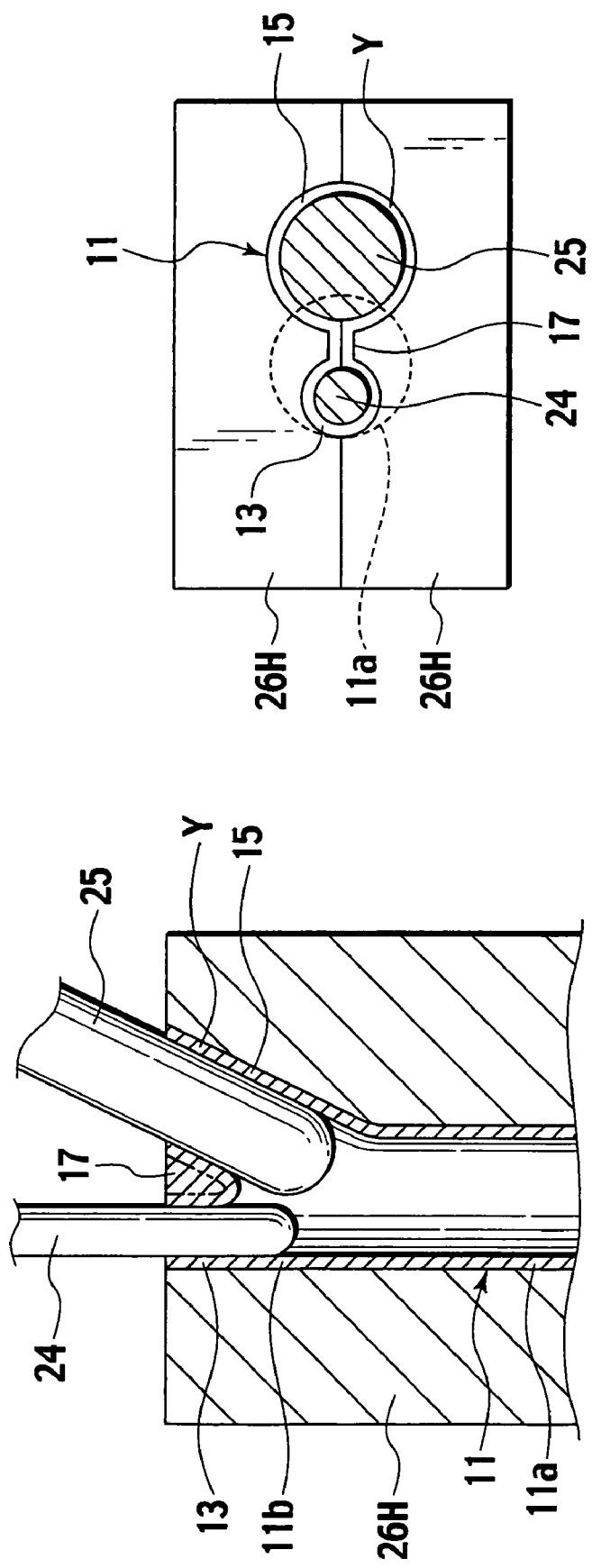

DOUBLE PIPE FORKED PART STRUCTURE AND METHOD OF MAKING THE SAME

CROSS REFERENCE TO RELATED APPLICATIONS

This application is based upon and claims the benefit of priority from the prior Japanese Patent Applications Nos. 2004-068202 and 2004-068203 filed on Mar. 10, 2004; the entire contents of which are incorporated herein by reference.

BACKGROUND OF THE INVENTION

1. Field of the Invention

The present invention relates to a forked part structure of a double pipe with an inner pipe passing through an outer pipe, and a method of making the same.

2. Description of the Related Art

There is a double pipe provided with an inner pipe inside an outer pipe to form two flow paths. The use of such double pipes enables a simple and compact piping layout, and thus is favorable for a piping layout which has many restrictions. It is especially favorable for a piping layout of a vehicle air-conditioning system or the like, which is greatly restricted by a vehicle body structure or the like. The use of double pipes can also simplify assembly operations of an air-conditioning system, thereby reducing manufacturing costs.

Such double pipes need forked parts at their ends for connecting inner and outer pipes to different pipes. A forked part structure of a double pipe is disclosed in Japanese Published Unexamined Application No. S58-121394. In this double pipe forked part structure, an end portion of an outer pipe is expanded so that the end portion of the outer pipe is formed in a spectacle shape in cross section having two separate tubular portions. An inner pipe is inserted into and brazed to one tubular portion (inner pipe supporting portion), and a branch pipe is inserted into and brazed to the other tubular portion (branch pipe supporting portion).

In this structure, the inner pipe is brought into contact with or is likely to come into contact with the inner periphery of a main portion of the outer pipe. When the double pipe is placed on a vibrating body such as a vehicle, the inner or outer pipe vibrates, and can cause intermittent contact between the inner and outer pipes, producing a chattering sound.

Also, in this structure, it is probable that the gaps between the worked open end portion of the outer pipe and the inner pipe and the branch pipe inserted into the open end portion cannot be completely hermetically sealed by brazing. Especially when the two tubular portions are in close proximity, the joint margin of a joint formed between the two tubular portions is reduced, and the hermetic sealing at the end portion of the outer pipe can deteriorate.

SUMMARY OF THE INVENTION

It is an object of the present invention to provide a double pipe forked part structure and a method of making the same, which can prevent outer and inner pipes from intermittently contacting each another by vibration, which produces a chattering sound.

It is another object of the present invention to provide a double pipe forked part structure and a method of making the same, in which an inner pipe supporting portion and a branch pipe supporting portion are formed at an open end portion of an outer pipe, and an inner pipe is inserted into and brazed to the inner pipe supporting portion and a branch pipe is inserted into and brazed to the branch pipe supporting portion, whereby hermetic sealing of the end portion of the outer pipe improves.

BRIEF DESCRIPTION OF THE SEVERAL VIEWS OF THE DRAWINGS

FIGS. 3A and 3B are explanatory diagrams illustrating the state before a punching step of decentering an open end portion of an outer pipe, in a method of making a double pipe forked part in the first embodiment; FIG. 3A is a side view; FIG. 3B is a top view;

FIG. 4A is a side view; FIG. 4B is a top view;

FIG. 5A is a side view; FIG. 5B is a top view;

FIG. 6A is a side view; FIG. 6B is a top view;

FIGS. 7A and 7B are explanatory diagrams illustrating a punching step of punching and expanding open ends of an inner pipe supporting portion and a branch pipe supporting portion, in the method of making the double pipe forked part in the first embodiment; FIG. 7A is a side view; FIG. 7B is a top view;

FIGS. 8A and 8B are explanatory diagrams illustrating the shape of the worked one end portion of the outer pipe, in the method of making the double pipe forked part in the first embodiment; FIG. 8A is a top view; FIG. 8B is a longitudinal cross-sectional view of the outer pipe;

FIGS. 12A and 12B are explanatory diagrams illustrating a punching step of decentering an open end portion of an outer pipe, in a method of making a double pipe forked part in a fourth embodiment; FIG. 12A is a side view; FIG. 12B is a top view;

FIG. 13A is a side view; FIG. 13B is a top view;

FIG. 14A is a side view; FIG. 14B is a top view;

FIG. 16A is a side view; FIG. 16B is a top view;

FIG. 17A is a side view; FIG. 17B is a top view;

FIG. 18A is a side view; FIG. 18B is a top view;

FIGS. 19A and 19B are explanatory diagrams illustrating the pressing step of pressing the decentered open end portion of the outer pipe, in the method of making the double pipe forked part in the fifth embodiment; FIG. 19A is a side view; FIG. 19B is a top view;

FIGS. 20A and 20B are diagrams illustrating a double pipe forked part structure in the fifth embodiment; FIG. 20A is a longitudinal cross-sectional view of the outer pipe; FIG. 20B is a top view;

FIG. 22A is a longitudinal cross-sectional view of an outer pipe; FIG. 22B is a perspective view showing contact between an inner pipe and a branch pipe;

FIGS. 23A and 23B are explanatory diagrams illustrating a process of forming, by a single press, an unworked open end portion of an outer pipe into a figure eight-shaped cross-section end portion including an inner pipe supporting portion and a branch pipe supporting portion, in a method of making a double pipe forked part in a seventh embodiment;

FIGS. 26A and 26B are explanatory diagrams illustrating the state before a punching step of bending an open end portion of an outer pipe, in a method of making a double pipe forked part in the eighth embodiment; FIG. 26A is a side view; FIG. 26B is a top view;

FIG. 27A is a side view; FIG. 27B is a top view;

FIGS. 28A and 28B are explanatory diagrams illustrating the state before a pressing step of pressing the bent open end portion of the outer pipe, in the method of making the double pipe forked part in the eighth embodiment; FIG. 28A is a side view; FIG. 28B is a top view;

FIGS. 29A and 29B are explanatory diagrams illustrating the pressing step of pressing the bent open end portion of the outer pipe, in the method of making the double pipe forked part in the eighth embodiment; FIG. 29A is a side view; FIG. 29B is a top view;

FIG. 30A is a side view; FIG. 30B is a top view;

FIG. 31A is a top view; FIG. 31B is a longitudinal cross-sectional view of the outer pipe;

FIGS. 35A and 35B are explanatory diagrams illustrating the state before a punching step of bending an open end portion of an outer pipe in a method of making a double pipe forked part in an eleventh embodiment; FIG. 35A is a side view; FIG. 35B is a top view;

FIG. 36A is a side view; FIG. 36B is a top view;

FIGS. 37A and 37B are explanatory diagrams illustrating the state before a pressing step of pressing the bent open end portion of the outer pipe in the method of making the double pipe forked part in the eleventh embodiment; FIG. 37A is a side view; FIG. 37B is a top view;

FIGS. 38A and 38B are explanatory diagrams illustrating the pressing step of pressing the bent open end portion of the outer pipe, in the method of making the double pipe forked part in the eleventh embodiment; FIG. 38A is a side view; FIG. 38B is a top view;

FIG. 39A is a side view; FIG. 39B is a top view;

FIG. 40A is a top view; FIG. 40B is a longitudinal cross-sectional view of the outer pipe;

DETAILED DESCRIPTION OF THE INVENTION

Embodiments of the present invention will be described below with reference to the drawings.

In the first to seventh embodiments, a double pipe forked part structure capable of preventing a chattering sound, and a method of making the same will be described.

First Embodiment

FIGS. 1 to 9 illustrate the first embodiment.

[Entire Structure of Double Pipe]

Figure 1:
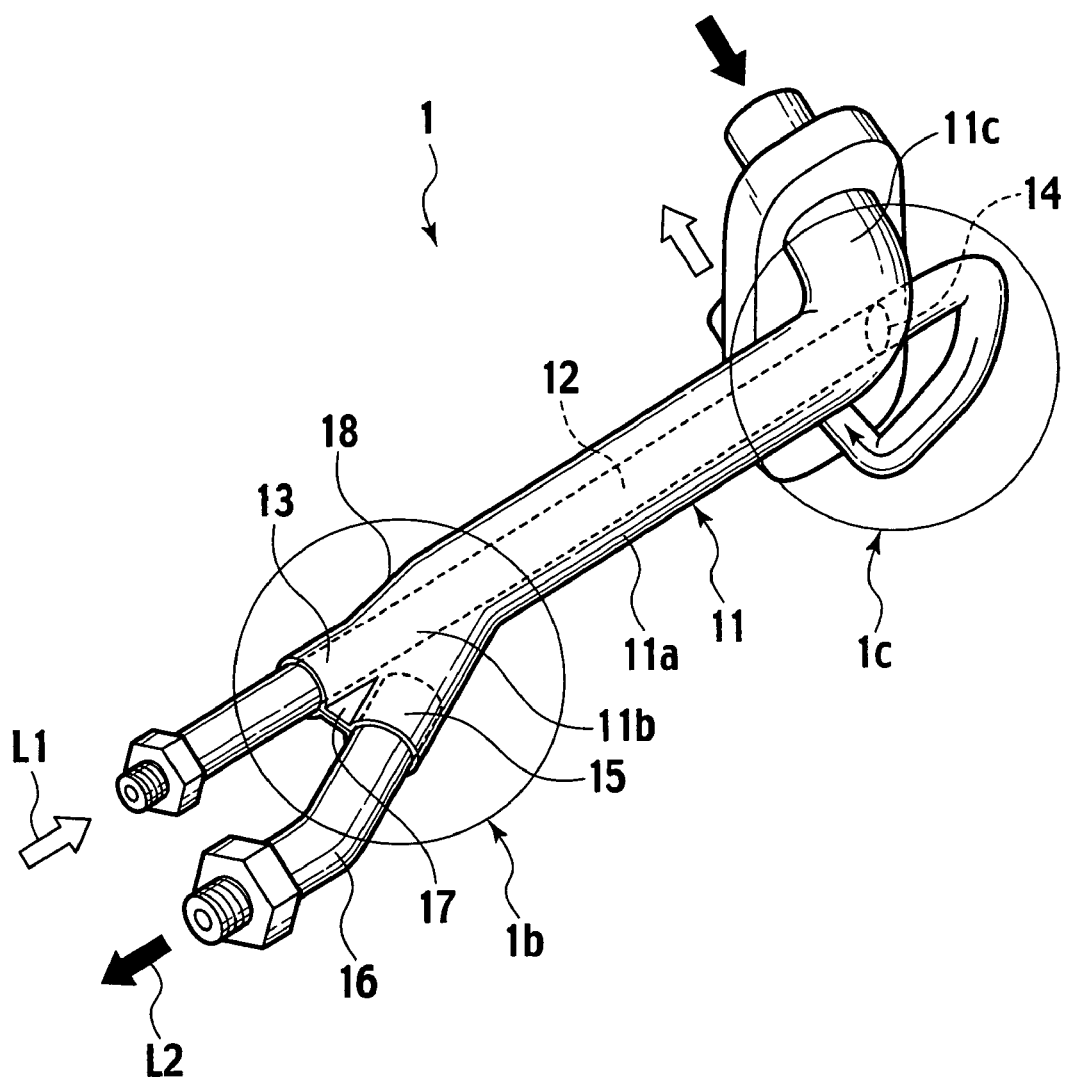
FIG. 1 is a perspective view of a double pipe in use employing a double pipe forked part structure in a first embodiment.
Figure 2:
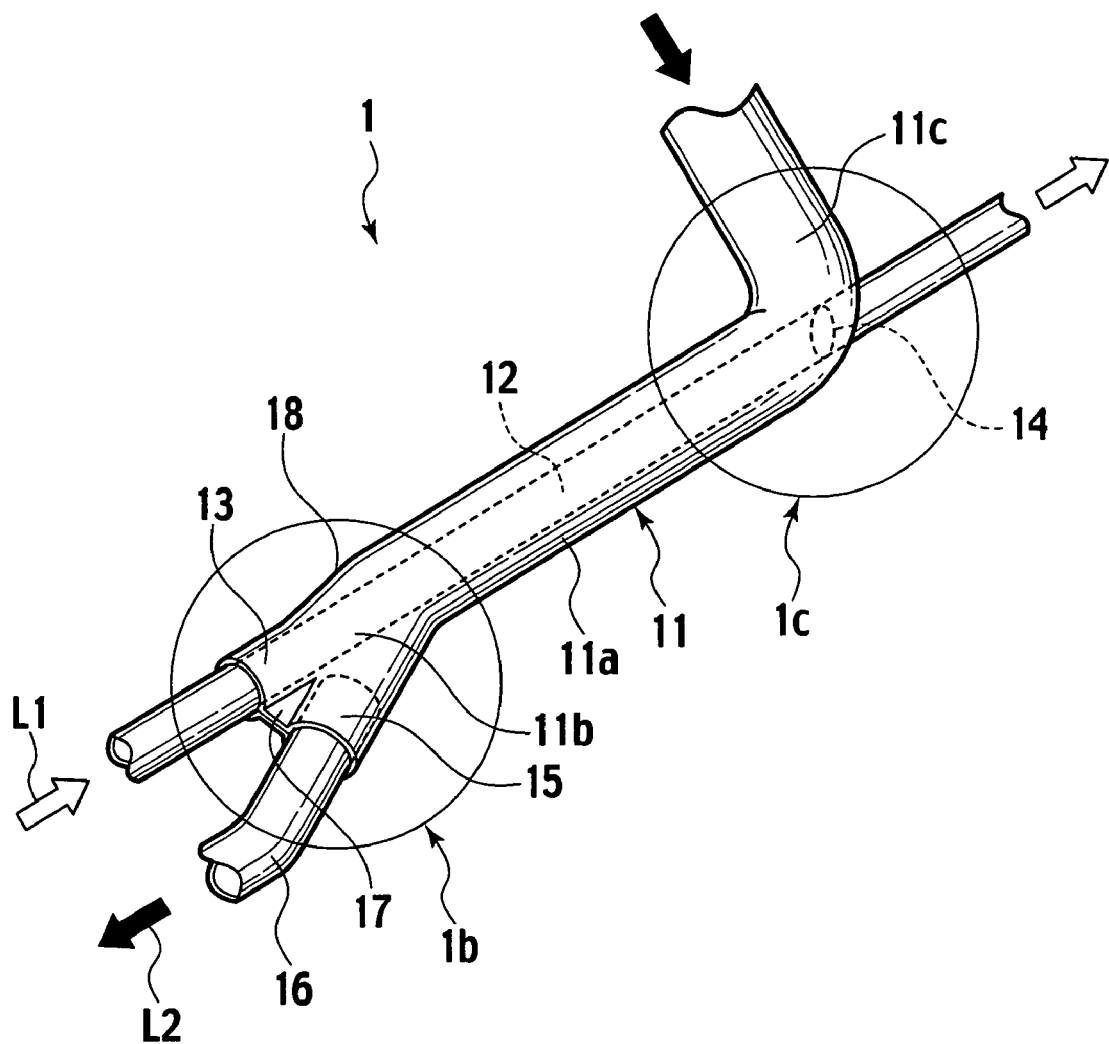
FIG. 2 is a perspective view of the double pipe employing the double pipe forked part structure in the first embodiment.

As shown in FIGS. 1 and 2, a double pipe 1 includes an outer pipe 11 and an inner pipe 12. The inner pipe 12 allows a first fluid L1 (shown by an arrow in FIGS. 1 and 2) to flow therethrough, and a passage between the outer pipe 11 and the inner pipe 12 (between the inner periphery of the outer pipe 11 and the outer periphery of the inner pipe 12) allows a second fluid L2 (shown by an arrow in FIGS. 1 and 2) to flow therethrough. The flow directions of the first and second fluids L1 and L2 in FIGS. 1 and 2 are just an example. The double pipe 1 is manufactured not by integrally forming an outer pipe and an inner pipe with ribs therebetween in a conventional manner (see Japanese Published Unexamined Application No. 2002-228072, for example), but by combining a large-diameter pipe (outer pipe 11) and a small-diameter pipe (inner pipe 12) which are prepared separately. More specifically, the outer pipe 11 and the inner pipe 12 are brazed together with the inner pipe 12 passing through the outer pipe 11 through two tubular inner pipe supporting portions 13, 14 formed in the outer pipe 11. In an axial projection drawing of the outer pipe 11, the inner pipe supporting portions 13, 14 are located radially inward of a main portion 11a of the outer pipe 11. Thus, the inner pipe 12 supported by the inner pipe supporting portions 13, 14 keeps a distance from the inner periphery of the outer pipe 11. This arrangement prevents intermittent contact between the outer pipe 11 and the inner pipe 12 due to vibrations of the double pipe 1.

The double pipe 1 requires at its opposite ends forked structures 1b, 1c for connecting the inner and outer pipes 12, 11 to different pipes.

At the forked part 1b at a first end of the double pipe 1, an open end portion 11b of the outer pipe 11 is formed into a spectacle shape in cross section, provided with two tubular portions 13, 15. The inner pipe 12 passes through one tubular portion (inner pipe supporting portion 13), and a branch pipe 16 is connected to and supported by the other tubular portion (branch pipe supporting portion 15). In this manner, the forked part 1b is formed at the first end of the double pipe 1.

At the forked part 1c at a second end of the double pipe 1, the outer pipe 11 is bent in an L shape. The tubular inner pipe supporting portion 14 is formed by drilling or burring in an L-shaped bent portion 11c. The inner pipe 12 passes through the inner pipe supporting portion 14 into the outer pipe 11. In this manner, the forked part 1c is formed at the second end of the double pipe 1.

[Forked Part Structure]

This embodiment is characterized by the structure of the forked part 1b at the first end of the double pipe 1. Hereinafter, the structure of the forked part 1b at the first end will be described in more detail.

At the forked part 1b at the first end of the double pipe 1, the open end portion 11b of the outer pipe 11 includes the separate cylindrical inner pipe supporting portion 13 (not limited to a cylindrical shape in the present invention) and cylindrical branch pipe supporting portion 15 (not limited to a cylindrical shape in the present invention). The inner pipe 12 passed through and supported by the inner pipe supporting portion 13 is brazed thereto, and the branch pipe 16 connected to and supported by the branch pipe supporting portion 15 is brazed thereto. The inner pipe supporting portion 13 and the branch pipe supporting portion 15 are formed by individual closed cross-section structures separated by a joint portion 17 of a two-layer flat plate. With this, the open end portion 1b of the outer pipe 11 is formed in a spectacle shape in cross section over a predetermined length.

The inner pipe supporting portion 13 is formed with a smaller diameter than the linear main portion 11a of the outer pipe 11. The inner pipe supporting portion 13 is smoothly continuous with the main portion 11a of the outer pipe 11 through an inclined portion 18, and is located radially inward of the inner periphery of the main portion 11a in a plane of projection along an extending direction of the main portion 11a. In this embodiment, the inner pipe 12 is located in an axis position of the main portion 11a of the outer pipe 11. That is, the axis of the inner pipe 12 coincides with the axis of the main portion 11a. In other words, the axes of the inner pipe supporting portions 13,14 coincide with the axis of the main portion 11a of the outer pipe 11.

The branch pipe supporting portion 15 is formed with a smaller diameter than the main portion 11a of the outer pipe 11, and a larger diameter than the inner pipe supporting portion 13. Alternatively, the branch pipe supporting portion 15 may be smaller in diameter than the inner pipe supporting portion 13, or larger in diameter than the main portion 11a of the outer pipe 11. The axis of the branch pipe supporting portion 15 is out of alignment with the axis of the main portion 11a of the outer pipe 11, and is inclined with respect to the main portion 11a of the outer pipe 11 and the inner pipe supporting portion 13.

Figure 9:
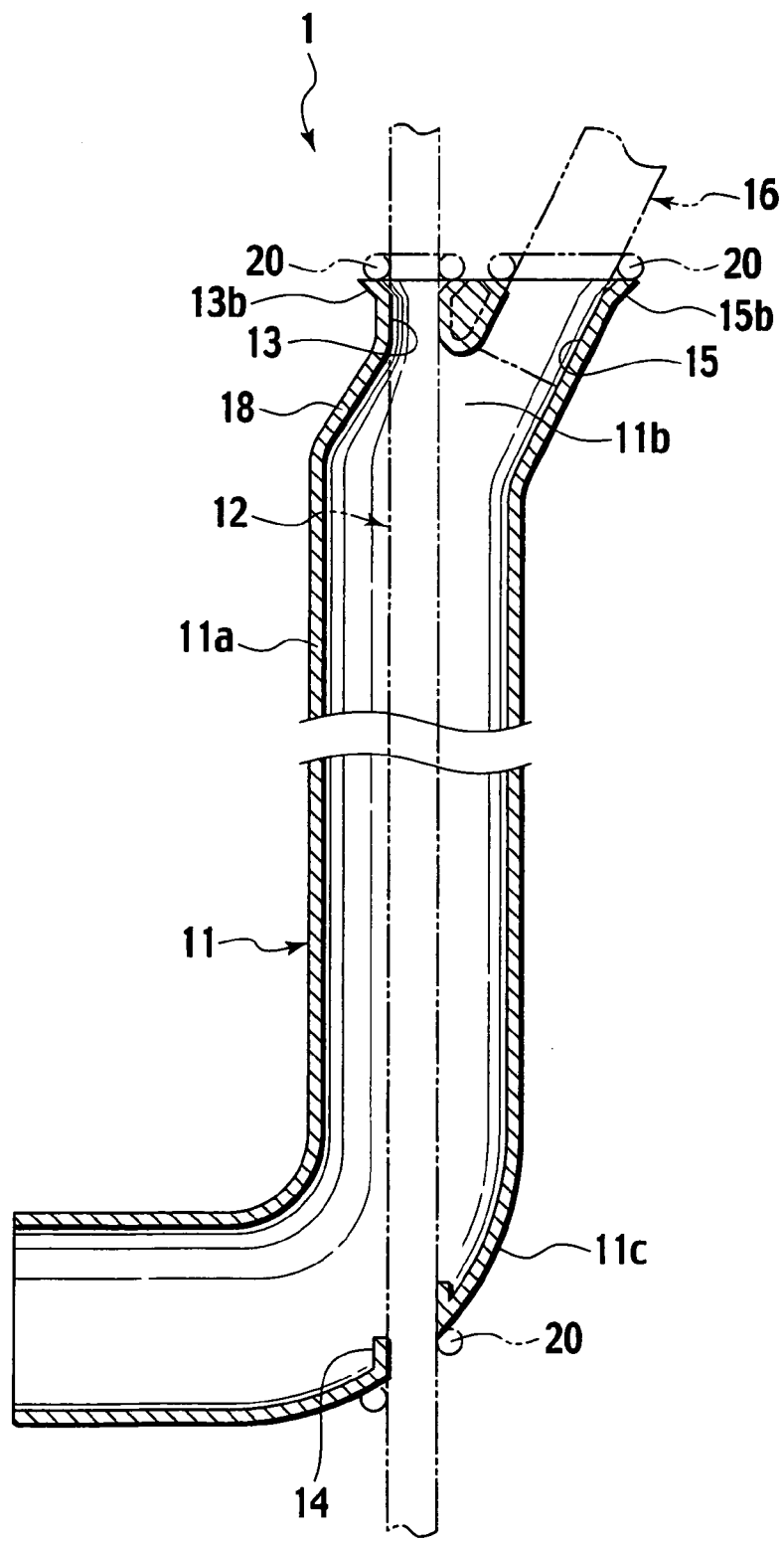
FIG. 9 is an explanatory longitudinal cross-sectional view of the outer pipe illustrating a brazing process in the method of making the double pipe forked part in the first embodiment.

Open ends 13b, 15b of the inner pipe supporting portion 13 and the branch pipe supporting portion 15 are expanded in flares as shown in FIG. 8. When the outer pipe 11, the inner pipe 12 and the branch pipe 16 are fixed by brazing with ring-shaped brazing materials 20 disposed on the open ends 13b, 15b of the inner pipe supporting portion 13 and the branch pipe supporting portion 15 as shown in FIG. 9, the flares increase the stability of the disposed brazing materials 20.

[Forked Part Making Method]

A method of making the forked part 1b will be described with reference to FIGS. 3 to 8.

The method of making the forked part 1b is broadly divided into two processes: an "end portion working process" for forming the open end portion 11b of the outer pipe 11 into a predetermined shape, and a "brazing process" for brazing the inner pipe 12 and the branch pipe 16 that is inserted into the outer pipe 11 after the end portion working process.

[End Portion Working Process]

Figure 4B:
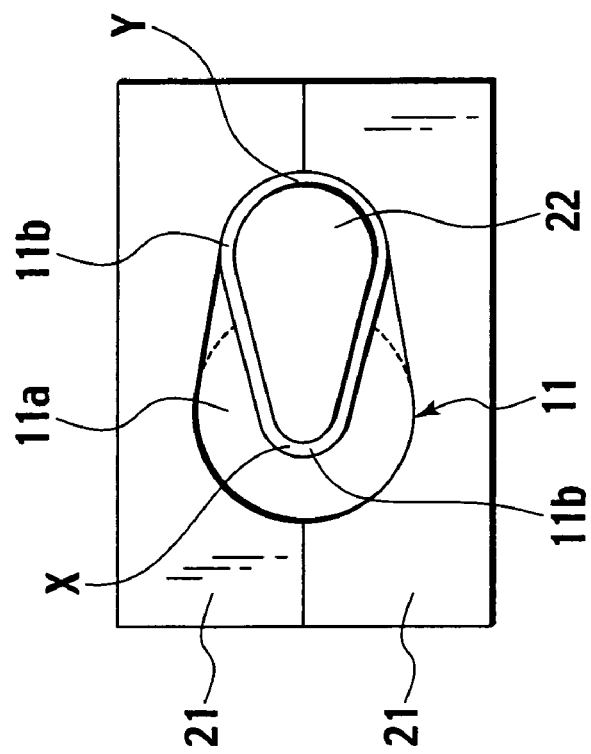
FIGS. 4A and 4B are explanatory diagrams illustrating the punching step of decentering the open end portion of the outer pipe, in the method of making the double pipe forked part in the first embodiment.
Figure 4A:
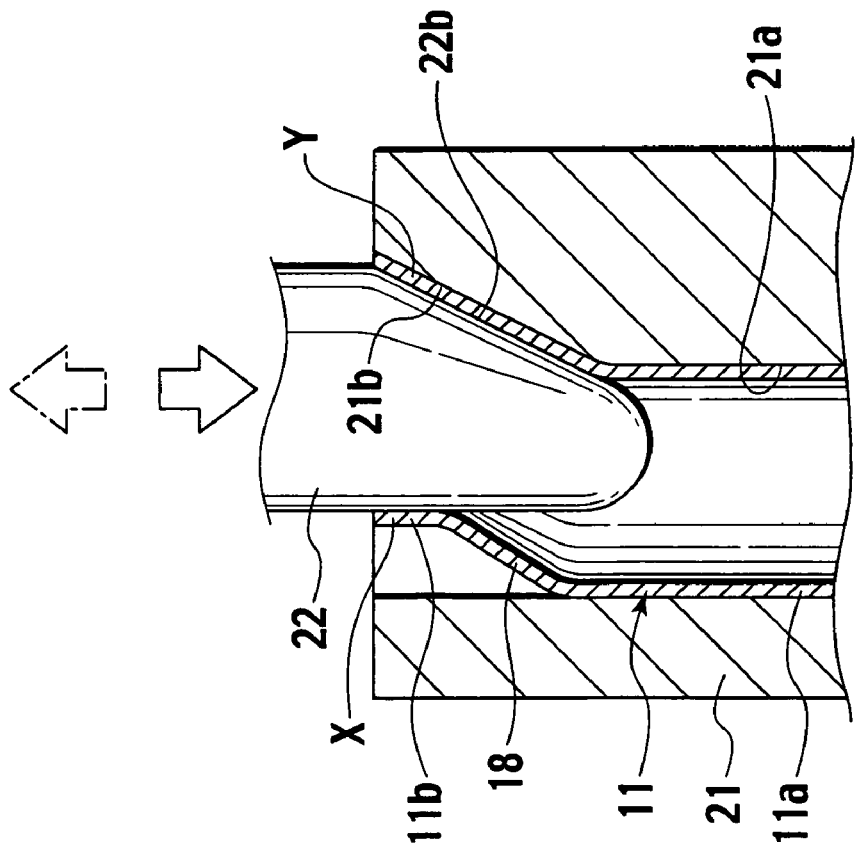

(i) First, as shown in FIGS. 3A to 4B, a punch 22 is press fitted into the unworked open end portion 11b of the linear outer pipe 11, to bend and decenter the open end portion 11b of the outer pipe 11 with respect to the main portion 11a of the outer pipe 11 (FIGS. 4A and 4B). A part X of the deformed open end portion 11b of the outer pipe 11 is formed in parallel with the main portion 11 of the outer pipe 11, decentered radially inward of the main portion 11a of the outer pipe 11 in a plane of projection along an extending direction of the main portion 11a of the outer pipe 11, as shown in FIGS. 4A and 4B. A part Y of the deformed open end portion 11b of the outer pipe 11 is inclined to expand outward with respect to the main portion 11a of the outer pipe 11.

The punch 22 is generally in the shape of a rod as a whole, provided with an inclined surface 22b at its distal end in an axial vertical cross-sectional view as shown in FIG. 4A, and having a deformed elliptical shape with a large-diameter half circle on one side and a small-diameter half circle on the other side in a diametrical cross-sectional view as shown in FIG. 4B. In the state before punching shown in FIGS. 3A and 3B, the punch 22 is located axially outside of the outer pipe 11 as shown in FIG. 3A, and the inclined surface 22b of the punch 22 overlaps the periphery of the outer pipe 11 when viewed in the axial direction of the outer pipe 11. In the figures, reference numeral 21 denotes a die. The die 21 includes a retaining hole 21a for holding the outer pipe 11. The die 21 also includes, at an open end portion of the retaining hole 21, an inclined surface 21b corresponding to the inclined surface 22b at the distal end of the punch 22. The inclined surface 21b of the die 21 supports the punch 22 when working the end portion 11b of the outer pipe 11.

Figure 5A:
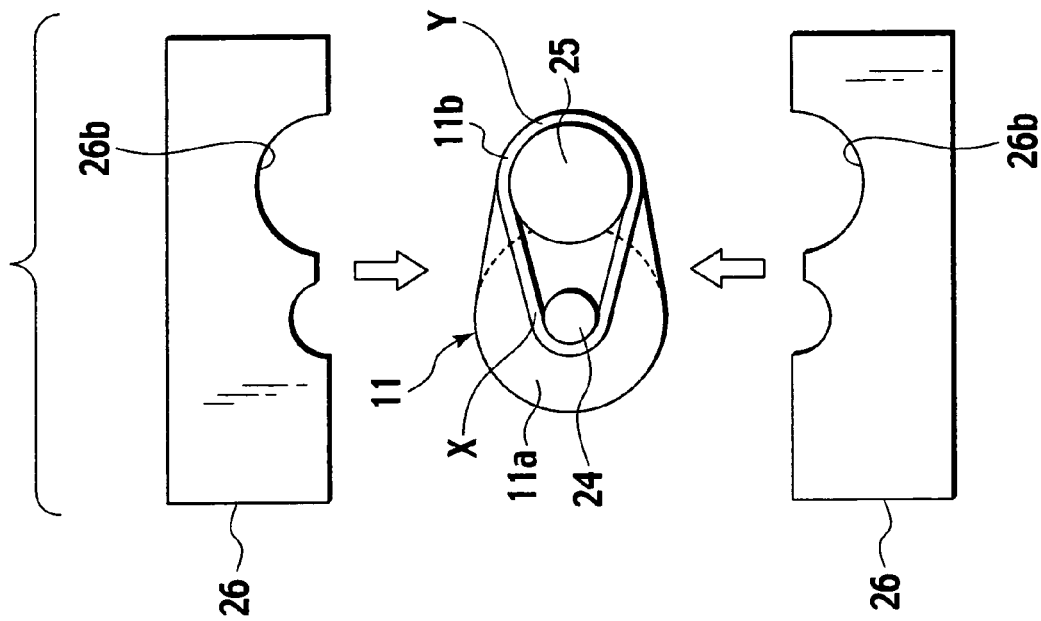
FIGS. 5A and 5B are explanatory diagrams illustrating the state before a pressing step of pressing the decentered open end portion of the outer pipe, in the method of making the double pipe forked part in the first embodiment.
Figure 5B:
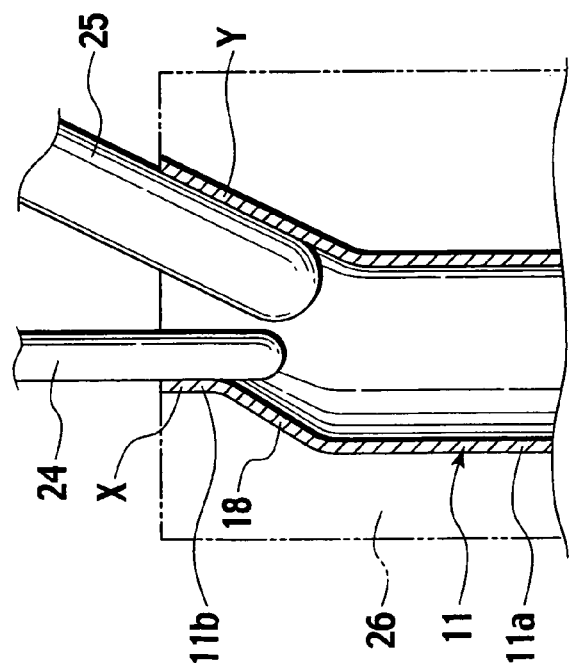

(ii) Then, as shown in FIGS. 5A to 6B, with two core bars 24, 25 inserted into the decentered open end portion 11b of the outer pipe 11, the outer pipe end portion 11b is radially pressed by faces 26b of a press die 26 into a spectacle shape in cross section. The core bar 24 corresponds to the inner pipe 12 in diameter, and the core bar 25 corresponds to the branch pipe 16 in diameter. As shown in FIGS. 5A and 5B, the core bar 24 corresponding to the inner pipe 12 is disposed in the part X decentered inward with respect to the main portion 11a of the outer pipe 11. The core bar 25 corresponding to the branch pipe 16 is disposed in the part Y bent and expanded outward with respect to the main portion 11a of the outer pipe 11, as shown in FIGS. 5A and 5B.

Figure 6B:
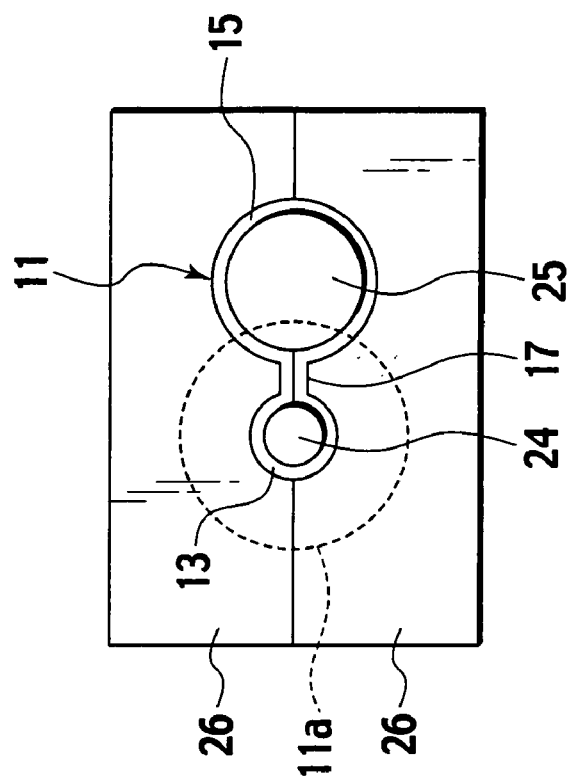
FIGS. 6A and 6B are explanatory diagrams illustrating the pressing step of pressing the decentered open end portion of the outer pipe, in the method of making the double pipe forked part in the first embodiment.
Figure 6A:
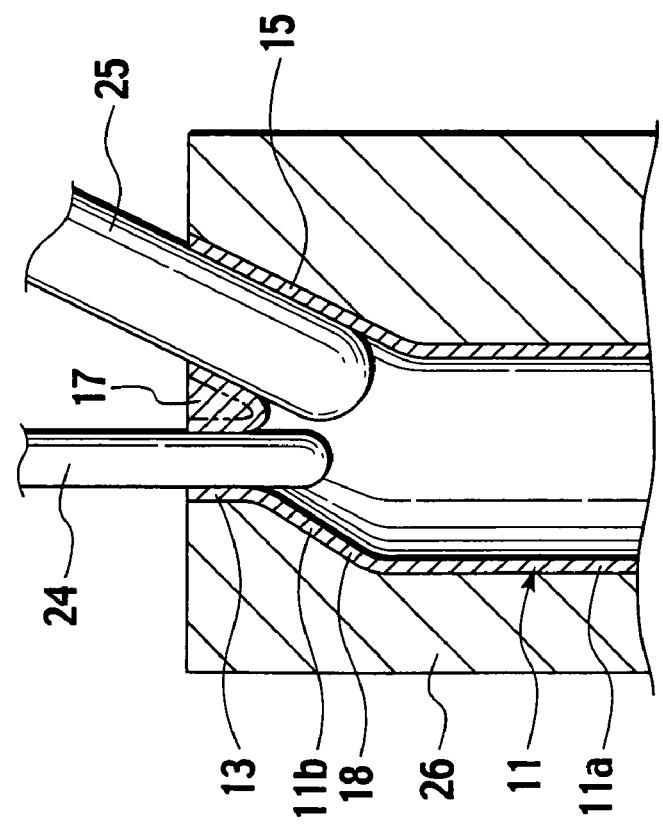

As shown in FIGS. 6A and 6B, the open end portion 11b deformed in a spectacle shape in cross section includes one cylindrical portion forming the inner pipe supporting portion 13 and the other cylindrical portion forming the branch pipe supporting portion 15. The inner pipe supporting portion 13 is located inward of the inner periphery of the main portion 11a of the outer pipe 11 in a plane of projection along an extending direction of the main portion 11a of the tubular pipe 11.

(iii) Then, as shown in FIGS. 7A and 7B, with the spectacle-shaped cross-section open end portion 11b held by a clamp 28, the open ends 13b, 15b of the inner pipe supporting portion 13 and the branch pipe supporting portion 15 are outwardly tapered by expanding punches 29, 30. The expanding punches 29, 30 in cylindrical shapes are formed at their distal ends with tapered inclined surfaces 29b, 30b. The clamp 28 is formed with tapered inclined surfaces 32 at an open end of an outer pipe retaining hole 31.

Through the steps (i), (ii) and (iii), the outer pipe 11 has a shape as shown in FIGS. 8A and 8B. Before or after the working of the end portion 11b at the first end of the outer pipe 11, the end portion 11c at the second end of the outer pipe 11 is bent in an L shape, and the tubular inner pipe supporting portion 14 is formed by drilling or burring in the L-shaped bent portion 11c (see FIG. 9). The inner pipe supporting portions 14 and 13 are provided in a straight line. In this embodiment, the inner pipe supporting portion 14 is projected inward of the outer pipe 11. Alternatively, in the present invention, the inner pipe supporting portion 14 may be projected outward of the outer pipe 11.

[Brazing Process]

As shown in FIG. 9, the linear inner pipe 12 is passed through the outer pipe 11 through the inner pipe supporting portions 13, 14 of the outer pipe 11, and the branch pipe 16 is inserted into the branch pipe supporting portion 15. The brazing materials 20 are placed on the ends of the supporting portions 13, 14 and 15 and heated to a predetermined temperature, thereby to fix the outer pipe 11, inner pipe 12 and branch pipe 16 together and hermetically seal the gaps in the supporting portions 13, 14 and 15 by the molten brazing materials 20. As a result, the double pipe 1 as shown in FIGS. 2 and 9 is formed.

The first embodiment has advantages as described below.

According to the structure of the forked part 1b of the double pipe 1 and its making method in the first embodiment, first, the inner pipe supporting portion 13 is located radially inward of the inner periphery of the main portion 11a of the outer pipe 11. This arrangement ensures that the inner pipe 12 supported by the inner pipe supporting portion 13 of the outer pipe 11 keeps a distance from the inner periphery of the outer pipe 11. Therefore, even when the double pipe 1 vibrates, the inner pipe 12 and the outer pipe 11 can avoid contact and be prevented from producing a chattering sound.

Second, since the inner pipe supporting portion 13 and the adjacent branch pipe supporting portion 15 are provided separately to form the first end portion 11b of the outer pipe 11 in a spectacle-shaped open portion, that is, the inner pipe 12 and the branch pipe 16 are supported by the individual tubular supporting portions 13, 15, the supporting stability is increased as compared with a structure in which tubular supporting portions 13, 15 communicate (as in the fifth and sixth embodiments described below, for example).

Third, since the open ends 13b, 15b of the inner pipe supporting portion 13 and the branch pipe supporting portion 15 are expanded in flares (tapers), the brazing materials 20 are easily disposed on the open ends 13b, 15b of the supporting portions 13, 15. Thus, the stability of the brazing materials 20 disposed in the brazing process is increased, resulting in a simplified production process.

Also, according to the method of making the forked part 1b of the double pipe 1 in the first embodiment, the end portion working process of the outer pipe 11 includes the punching step in which the punch 22 in a bar shape provided with the inclined surface 22 at the distal end is press fitted into the unworked open end portion 11b of the outer pipe 11 to decenter the open end portion 11b of the outer pipe 11 with respect to the main portion 11a. In the pressing step, the decentered end portion 11b of the outer pipe 11 is radially pressed by the press die 26 into a spectacle shape in cross-section. The open end portion 11b of the outer pipe 11 can be worked in a relatively small number of steps. In addition, since the open end portion 11b of the outer pipe 11 can be expanded by the punch 22, the inner pipe 12 and the branch pipe 16 supported by the open end portion 11b of the outer pipe 11 can be made larger in diameter, resulting in greater freedom of design.

Hereinafter, other embodiments will be described. Identical or similar components to those in the first embodiment are given the same reference numerals, and those components and their functional effects will not be described.

Second Embodiment

Figure 10:
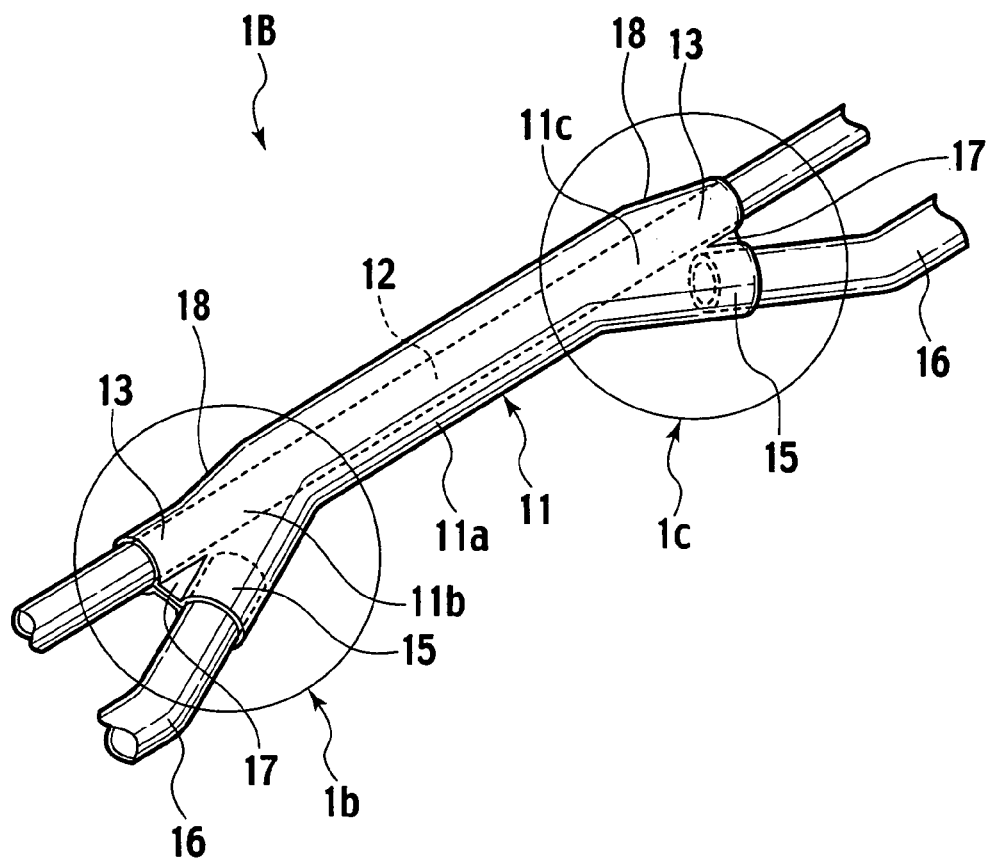
FIG. 10 is a perspective view of a double pipe in a second embodiment.
Figure 11:
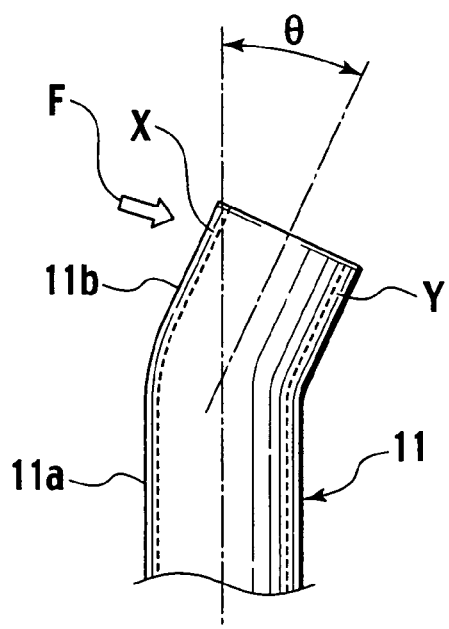
FIG. 11 is an explanatory diagram illustrating a bending step of decentering an open end portion of an outer pipe in a method of making a double pipe forked part in a third embodiment.

In the above-described first embodiment, the forked parts 1b, 1c at the first and second ends of the double pipe 1 are different in structure, but in a second embodiment shown in FIG. 10, forked parts 1b, 1c at opposite ends of a double pipe 1B have the same structure. The second embodiment can provide the same functional effects as the first embodiment.

Third Embodiment

In the above-described first embodiment, in the method of making the forked part 1b of the double pipe 1, the unworked open end portion 11b of the outer pipe 11 is decentered by the punch 22 as shown in FIGS. 3A to 4B. Alternatively, a radial force may be applied to an outer pipe 11 by a press or a bender, for example, to bend and decenter an end portion 11b of the outer pipe 11 at a predetermined angle θ with respect to a main portion 11a of the outer pipe 11.

In this bending step, an existing bender or press die can be used, eliminating the need for using a special working device (die 21, punch 22) as shown in the first embodiment, and allows an end portion of an outer pipe to be worked at a relatively low cost.

Fourth Embodiment

Figure 13B:
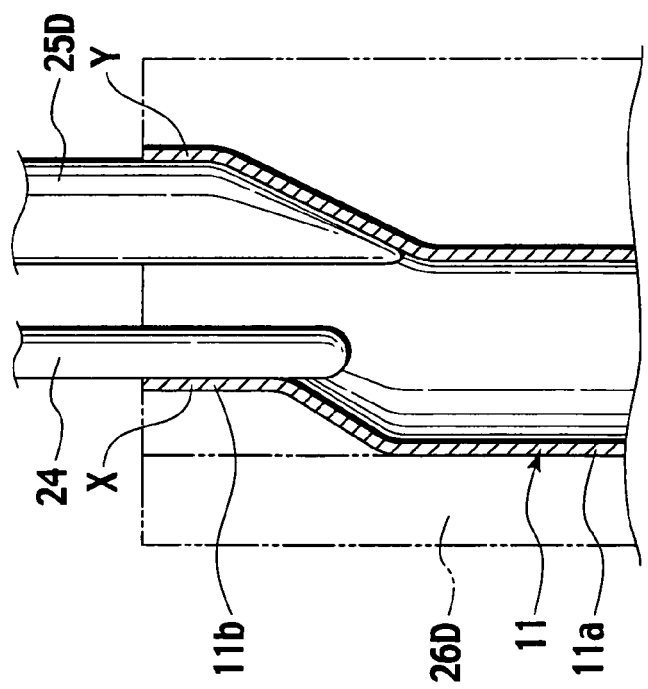
FIGS. 13A and 13B are explanatory diagrams illustrating the state before a pressing step of pressing the decentered open end portion of the outer pipe, in the method of making the double pipe forked part in the fourth embodiment.
Figure 13A:
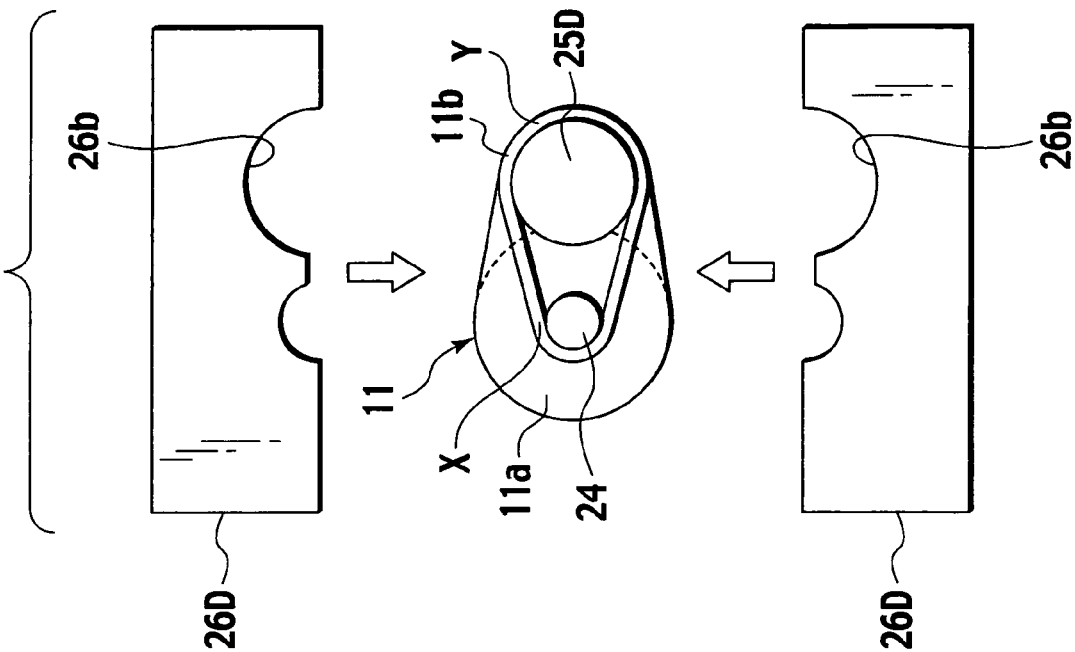
Figure 14B:
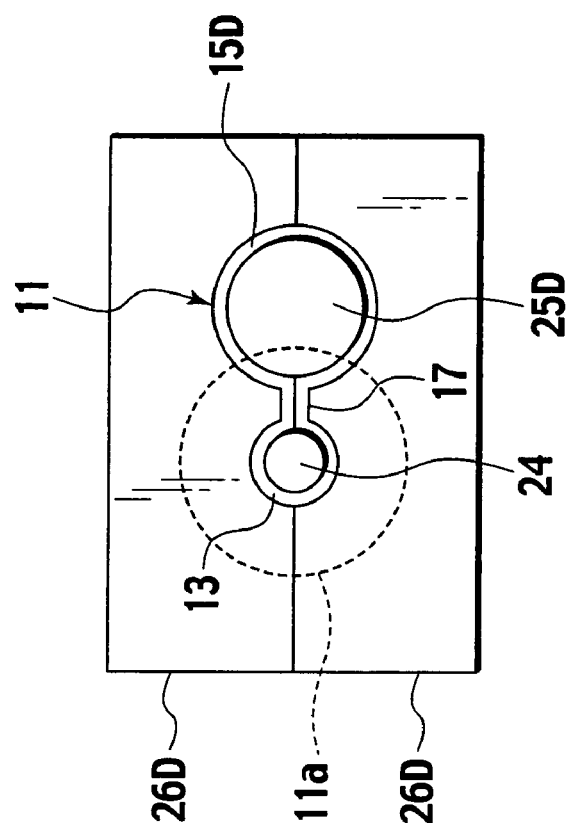
FIGS. 14A and 14B are explanatory diagrams illustrating the pressing step of pressing the decentered open end portion of the outer pipe, in the method of making the double pipe forked part in the fourth embodiment.
Figure 14A:
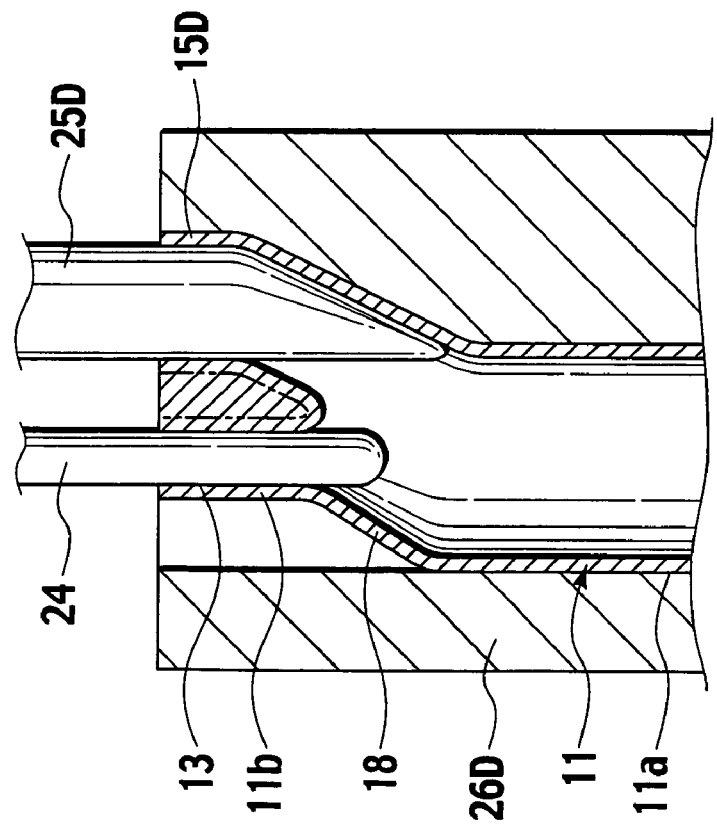
Figure 15:
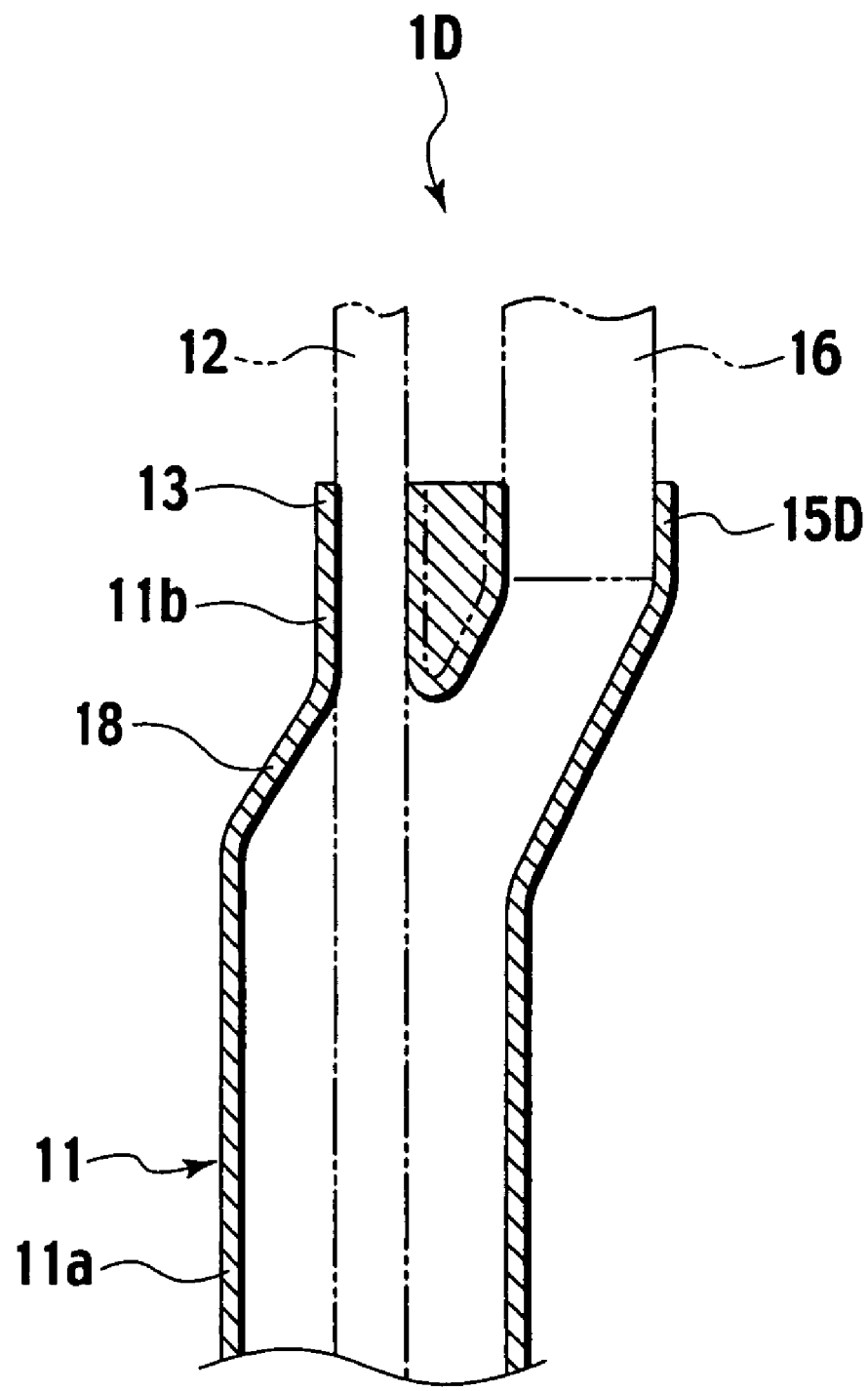
FIG. 15 is a longitudinal cross-sectional view of the outer pipe, showing a double pipe forked part structure in the fourth embodiment.

In the structure of the forked part 1b of the double pipe 1 in the above-described first embodiment, the branch pipe supporting portion 15 is inclined with respect to the inner pipe supporting portion 13. Alternatively, in the first to seventh embodiments, an inner pipe supporting portion 13 and a branch pipe supporting portion 15D may be arranged in parallel as in a double pipe 1D shown in FIG. 15. FIGS. 12A to 14B are diagrams supplementarily explaining a process of forming the inner pipe supporting portion 13 and the branch pipe supporting portion 15D in parallel, which will not be described because it includes similar production steps to those in the first embodiment. FIGS. 12A to 12B correspond to FIGS. 4A and 4B in the first embodiment; FIGS. 13A and 13B correspond to FIGS. 5A and 5B in the first embodiment; FIGS. 14A and 14B correspond to FIGS. 6A and 6B in the first embodiment. Reference numeral 21D denotes a die; 25D, a core bar; 26D, a press die.

Fifth Embodiment

Figure 16A:
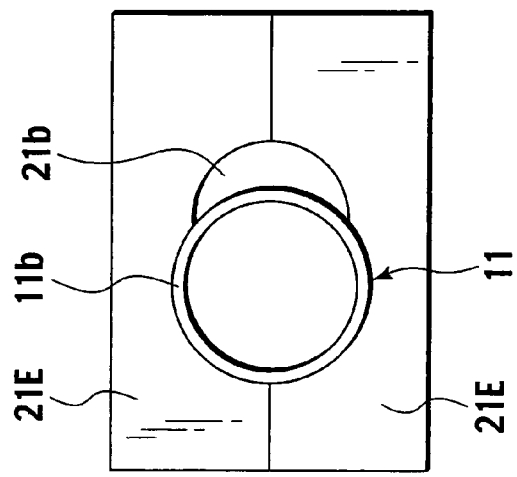
FIGS. 16A and 16B are explanatory diagrams illustrating the state before a punching step of decentering an open end portion of an outer pipe, in a method of making a double pipe forked part in a fifth embodiment.
Figure 16B:
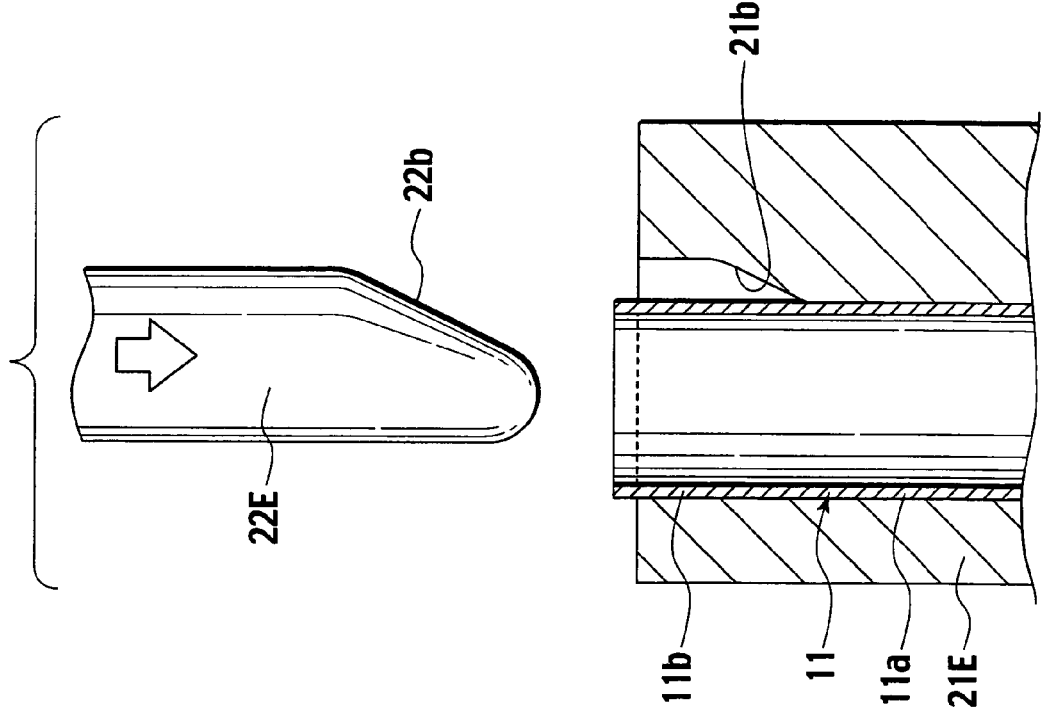
Figure 17B:
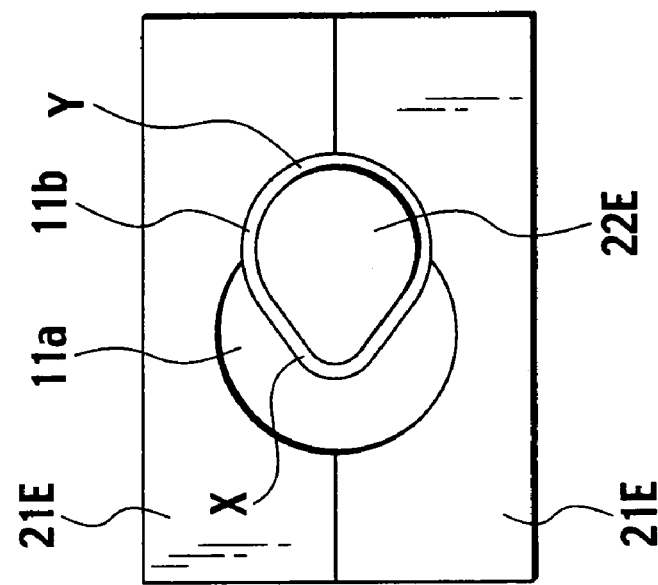
FIGS. 17A and 17B are explanatory diagrams illustrating the punching step of decentering the open end portion of the outer pipe, in the method of making the double pipe forked part in the fifth embodiment.
Figure 17A:
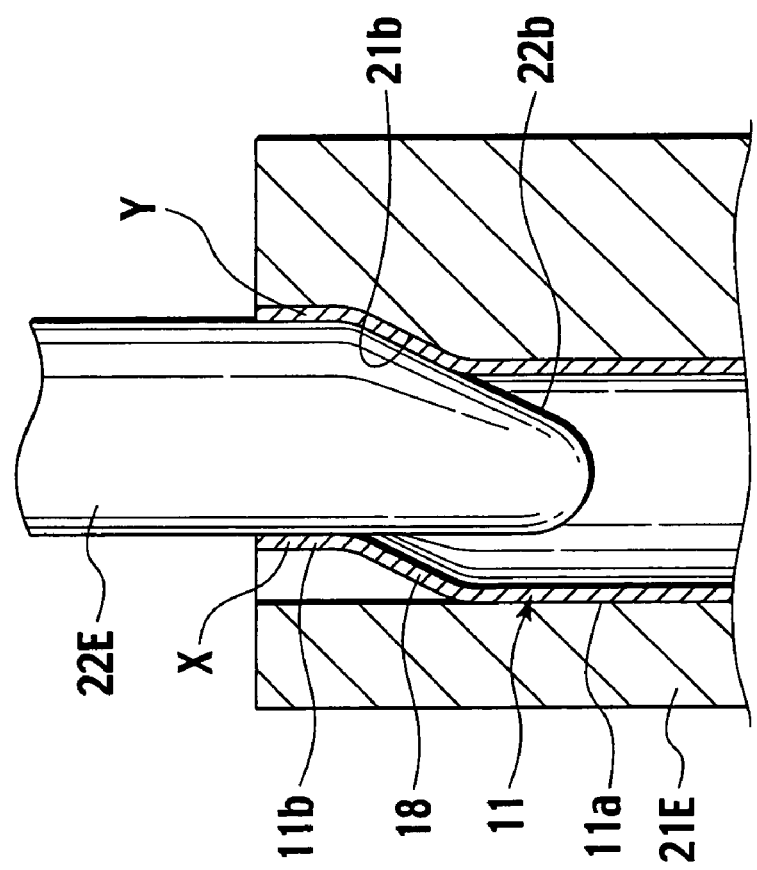
Figure 18B:
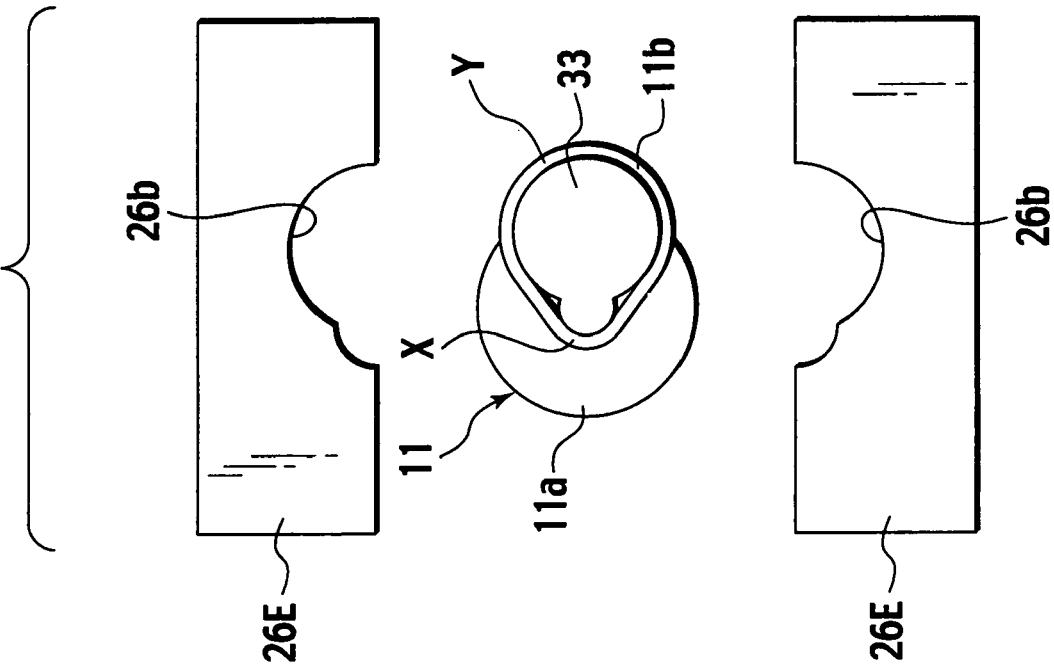
FIGS. 18A and 18B are explanatory diagrams illustrating the state before a pressing step of pressing the decentered open end portion of the outer pipe, in the method of making the double pipe forked part in the fifth embodiment.
Figure 18A:
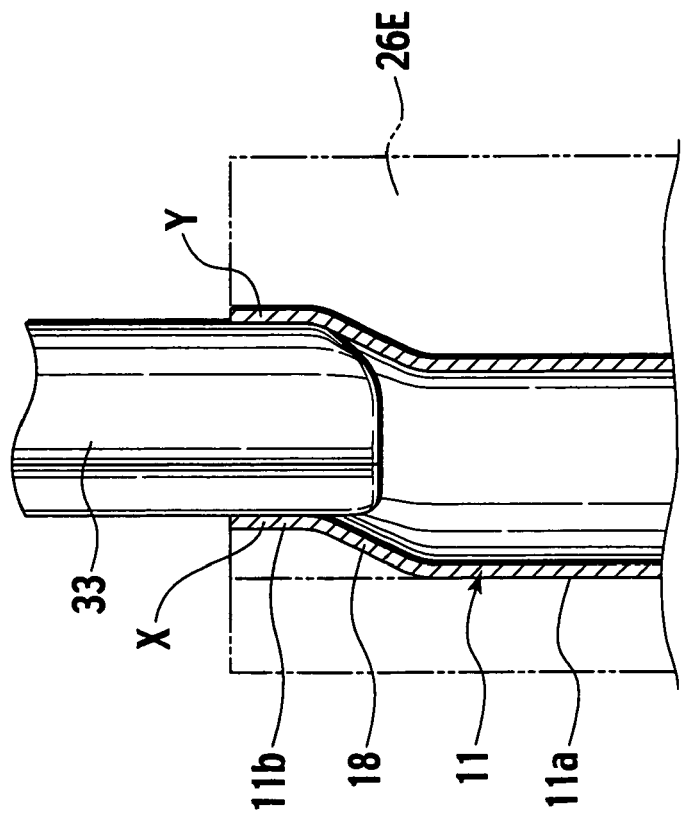
Figure 21:
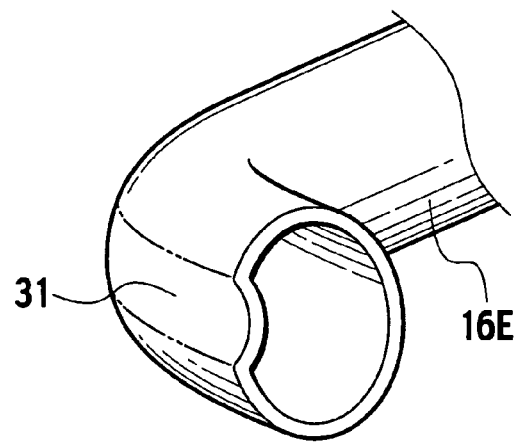
FIG. 21 is a partial perspective view showing the shape of a branch pipe for use in the double pipe forked part structure in the fifth embodiment.

In the above-described first embodiment, the open end portion 11b of the outer pipe 11 is formed in a spectacle shape in cross section by the separate tubular supporting portions 13, 15. Alternatively, in the first to seventh embodiments, an inner pipe supporting portion 13E and a branch pipe supporting portion 15E may be formed continuously in a figure eight shape in cross section as in a double pipe 1E shown in FIGS. 20A and 20B. FIG. 21 is a perspective view of a branch pipe 16E provided, with a depressed portion 31 to contact and fit an inner pipe 12. Also in the fifth embodiment, the inner pipe supporting portion 13E and the branch pipe supporting portion 15E are provided in parallel. FIGS. 16A to 19B are diagrams supplementarily explaining steps in the process of forming an open end portion 11b of an outer pipe 11 in a figure eight shape in cross section, which will not be described because they are similar production steps to those in the first embodiment. FIGS. 16A and 16B correspond to FIGS. 3A and 3B in the first embodiment; FIGS. 17A and 17B correspond to FIGS. 4A and 4B in the first embodiment; FIGS. 18A and 18B correspond to FIGS. 5A and 5B in the first embodiment; FIGS. 19A and 19B correspond to FIGS. 6A and 6B in the first embodiment. In the figures, reference numeral 21E denotes a die; 22E, a punch; 33, a core bar; 26b, a face of a press die 26E. The core bar 33 and the die faces 26b are formed in a figure eight shape of combined two circles in cross section, unlike in the first embodiment.

In this structure, the inner pipe supporting portion 13E and the branch pipe supporting portion 15E are provided in a communicating manner, eliminating a constricted portion between the inner pipe supporting portion 13E and the branch pipe supporting portion 5E. Thus, a figure eight-shaped open portion is easily press worked. Depending on the direction of the press working, the figure eight-shaped open portion 11b including the inner pipe supporting portion 13E and the branch pipe supporting portion 15E with the inner pipe supporting portion 13E located radially inward of the inner periphery of a main portion 11a of the outer pipe 11 can be formed by a single press.

Sixth Embodiment

Figure 22A:
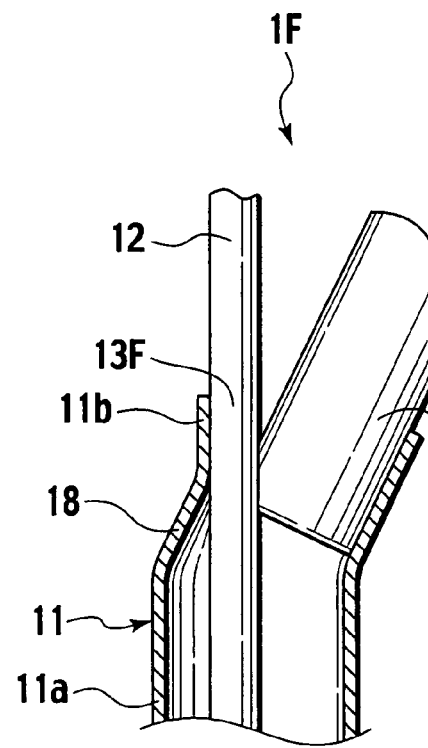
FIGS. 22A and 22B are diagrams illustrating a double pipe forked part structure in a sixth embodiment.
Figure 22B:
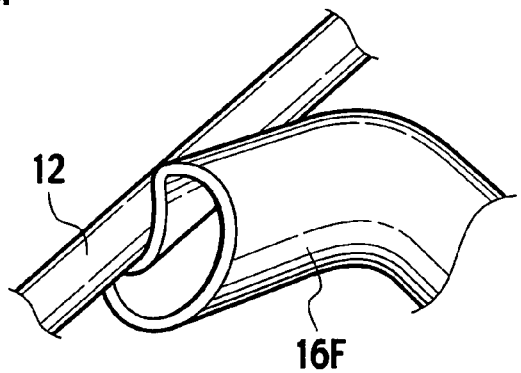

An open end portion 11b of an outer pipe 11 is formed in a figure eight shape in cross section as in the fifth embodiment. Even in that structure, a branch pipe 16F may be inclined with respect to an inner pipe 12 as in a double pipe 1F in the sixth embodiment shown in FIGS. 22A and 22B. FIG. 22B is a perspective view illustrating the contact between the branch pipe 16F and the inner pipe 12.

Seventh Embodiment

In the method of making the double pipe 1 in the above-described first to sixth embodiments, the process of forming the open end portion 11b of the outer pipe 11 in a spectacle or figure eight shape is performed in two steps: a punching step and a pressing step. Alternatively, as in a seventh embodiment shown in FIG. 23, it may be formed by a single press with a press die 26G. When a worked open end portion 11b of an outer pipe 11 includes no constricted portion as in the seventh embodiment, the open end portion 11b of the outer pipe 11 can be formed in a figure eight shape 13E, 15E in cross section by a single press.

In summary, according to the first to seventh embodiments, the inner pipe supporting portion is located radially inward of the inner periphery of the main portion of the outer pipe. This ensures that the inner pipe supported by the inner pipe supporting portion of the outer pipe keeps a distance from the inner periphery of the outer pipe. Therefore, the inner pipe and the outer pipe can be prevented from having contact and producing a chattering sound even when the double pipe vibrates.

Hereinafter, the eighth to twelfth embodiments will be described, which are embodiments that can improve hermetic sealing of an open end portion of an outer pipe.

Eighth Embodiment

FIGS. 24 to 32 illustrate an eighth embodiment.

[Entire Structure of Double Pipe]

Figure 24:
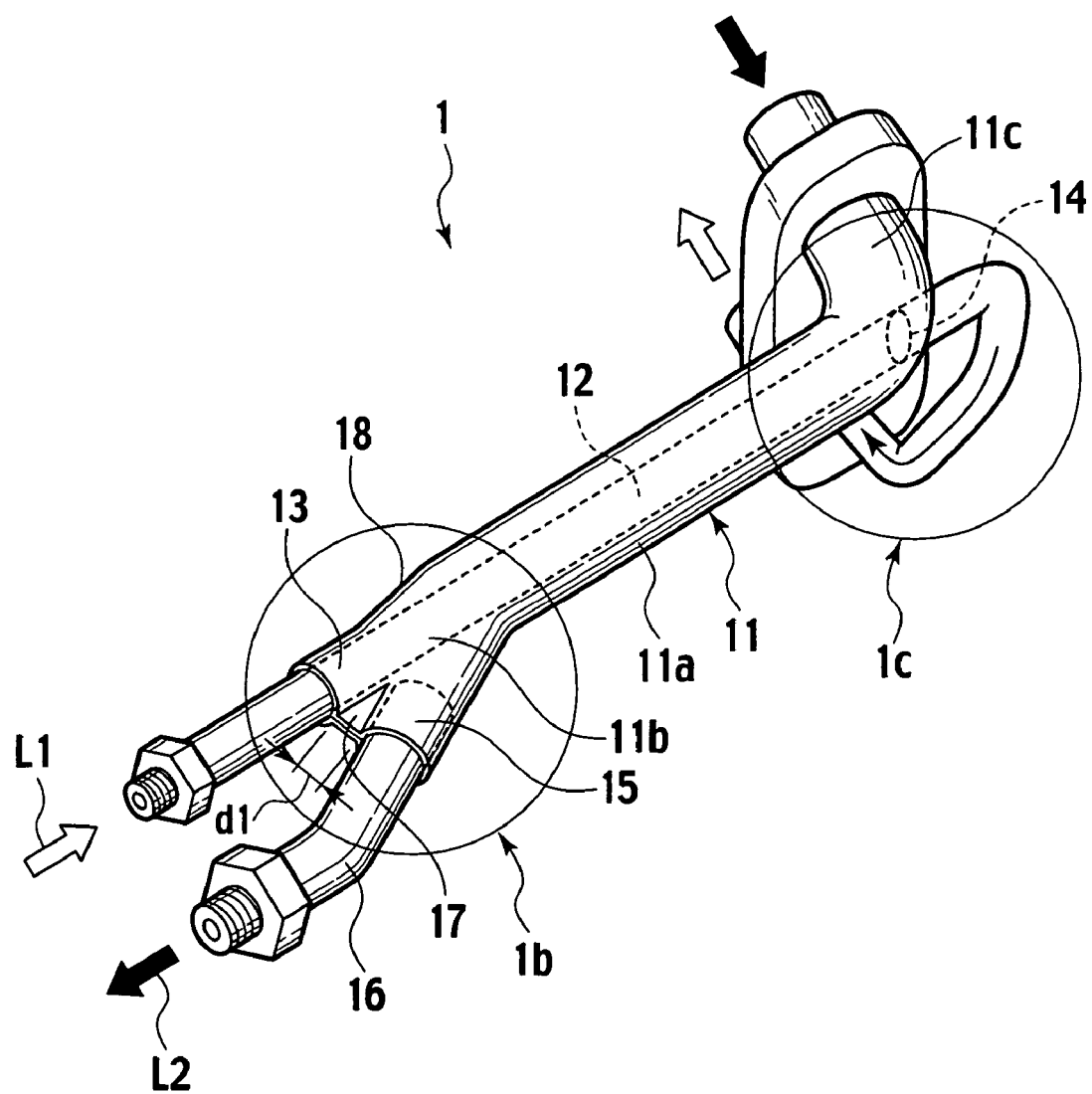
FIG. 24 is a perspective view of a double pipe in use employing a double pipe forked part structure in an eighth embodiment.
Figure 25:
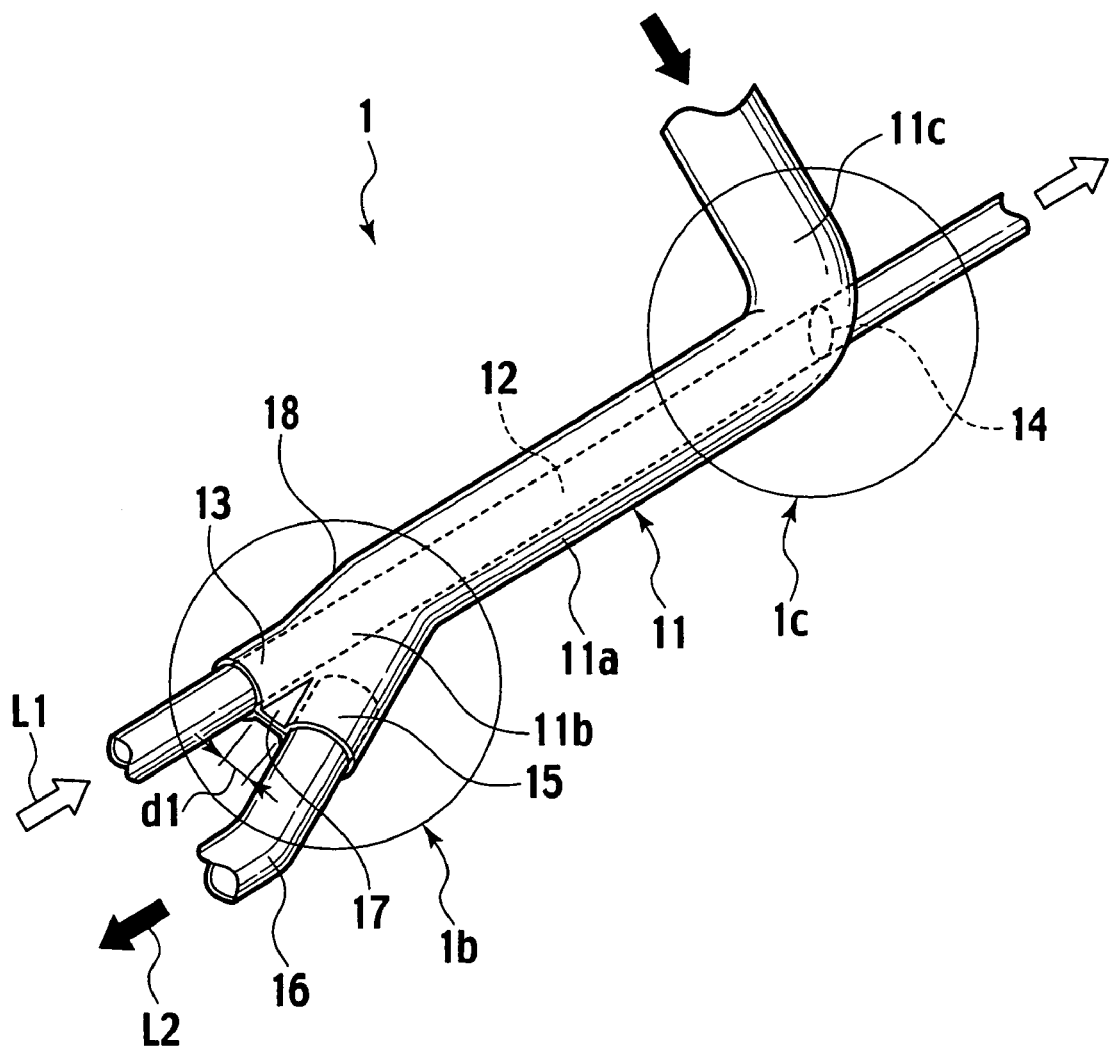
FIG. 25 is a perspective view of the double pipe employing the double pipe forked part structure in the eighth embodiment.

As shown in FIGS. 24 and 25, a double pipe 1 includes an outer pipe 11 and an inner pipe 12. The inner pipe 12 allows a first fluid L1 (shown by an arrow in FIGS. 24 and 25) to flow therethrough, and a passage between the outer pipe 11 and the inner pipe 12 (between the inner periphery of the outer pipe 11 and the outer periphery of the inner pipe 12) allows a second fluid L2 (shown by an arrow in FIGS. 24 and 25) to flow therethrough. The flow directions of the first and second fluids L1 and L2 in FIGS. 24 and 25 are just an example. The double pipe 1 is manufactured not by integrally forming an outer pipe and an inner pipe with ribs therebetween in a conventional manner (see Japanese Published Unexamined Application No. 2002-228072, for example), but by combining a large-diameter pipe (outer pipe 11) and a small-diameter pipe (inner pipe 12) which are prepared separately. More specifically, the outer pipe 11 and the inner pipe 12 are brazed together with the inner pipe 12 passing through the outer pipe 11 through two tubular inner pipe supporting portions 13, 14 formed in the outer pipe 11. In a plane of axial projection of the outer pipe 11, the inner pipe supporting portions 13, 14 are located radially inward of a main portion 11a of the outer pipe 11, so that the inner pipe 12 supported by the inner pipe supporting portions 13, 14 keeps a distance from the inner periphery of the outer pipe 11. This arrangement prevents intermittent contact between the outer pipe 11 and the inner pipe 12 due to vibrations of the double pipe 1.

The double pipe 1 requires at its opposite ends forked structures 1b, 1c for connecting the inner and outer pipes 12, 11 to different pipes.

At the forked part 1b at a first end of the double pipe 1, an open end portion 11b of the outer pipe 11 is formed in a spectacle shape in cross section, provided with two tubular portions 13, 15. The inner pipe 12 passes through one tubular portion (inner pipe supporting portion 13), and a branch pipe 16 is connected to and supported by the other tubular portion (branch pipe supporting portion 15). In this manner, the forked part 1b is formed at the first end of the double pipe 1.

At the forked part 1c at a second end of the double pipe 1, the outer pipe 11 is bent in an L shape. The tubular inner pipe supporting portion 14 is formed by drilling or burring in an L-shaped bent portion 11c. The inner pipe 12 passes through the outer pipe 11 through the inner pipe supporting portion 14. In this manner, the forked part 1c is formed at the second end of the double pipe 1.

[Forked Part Structure]

This embodiment is characterized by the structure of the forked part 1b at the first end of the double pipe 1. Hereinafter, the structure of the forked part 1b at the first end will be described in more detail.

At the forked part 1b at the first end of the double pipe 1, the open end portion 11b of the outer pipe 11 includes the separate cylindrical inner pipe supporting portion 13 (not limited to a cylindrical shape in the eighth to twelfth embodiments) and cylindrical branch pipe supporting portion 15 (not limited to a cylindrical shape in the eighth to twelfth embodiments). The inner pipe 12 that is passed through and supported by the inner pipe supporting portion 13 is brazed thereto, and the branch pipe 16 that is connected to and supported by the branch pipe supporting portion 15 is brazed thereto. The inner pipe supporting portion 13 and the branch pipe supporting portion 15 are formed by individual closed cross-section structures separated by a joint portion 17 of a two-layer flat plate. With this, the open end portion 1b of the outer pipe 11 is formed in a spectacle shape in cross section over a predetermined length.

The inner pipe supporting portion 13 is formed with a smaller diameter than the linear main portion 11a of the outer pipe 11. The inner pipe supporting portion 13 is smoothly continuous with the main portion 11a of the outer pipe 11 through an inclined portion 18, and is located radially inward of the inner periphery of the main portion 11a in a plane of projection along an extending direction of the main portion 11a. In this embodiment, the inner pipe 12 is located in an axial position of the main portion 11a of the outer pipe 11. That is, the axis of the inner pipe 12 coincides with the axis of the main portion 11a. In other words, the axes of the inner pipe supporting portions 13,14 coincide with the axis of the main portion 11a of the outer pipe 11.

The branch pipe supporting portion 15 is formed with a smaller diameter than the main portion 11a of the outer pipe 11, and with a larger diameter than the inner pipe supporting portion 13. Alternatively, the branch pipe supporting portion 15 may be smaller in diameter than the inner pipe supporting portion 13, or larger in diameter than the main portion 11a of the outer pipe 11. The axis of the branch pipe supporting portion 15 is out of alignment with the axis of the main portion 11a of the outer pipe 11, and is inclined with respect to the main portion 11a of the outer pipe 11 and the inner pipe supporting portion 13.

Open ends 13b, 15b of the inner pipe supporting portion 13 and the branch pipe supporting portion 15 are expanded in flares as shown in FIG. 31. When the outer pipe 11, the inner pipe 12 and the branch pipe 16 are fixed by brazing with ring-shaped brazing materials 20 disposed on the open ends 13b, 15b of the inner pipe supporting portion 13 and the branch pipe supporting portion 15 as shown in FIG. 32, the flares increase the stability of the disposed brazing materials 20.

[Forked Part Making Method]

A method of making the forked part 1b will be described with reference to FIGS. 26A to 31B.

The method of making the forked part 1b is broadly divided into two processes: an "end portion working process" for forming the open end portion 11b of the outer pipe 11 into a predetermined shape, and a "brazing process" for brazing the inner pipe 12 and the branch pipe 16 that is inserted after the end portion working process.

[End Portion Working Process]

Figure 27B:
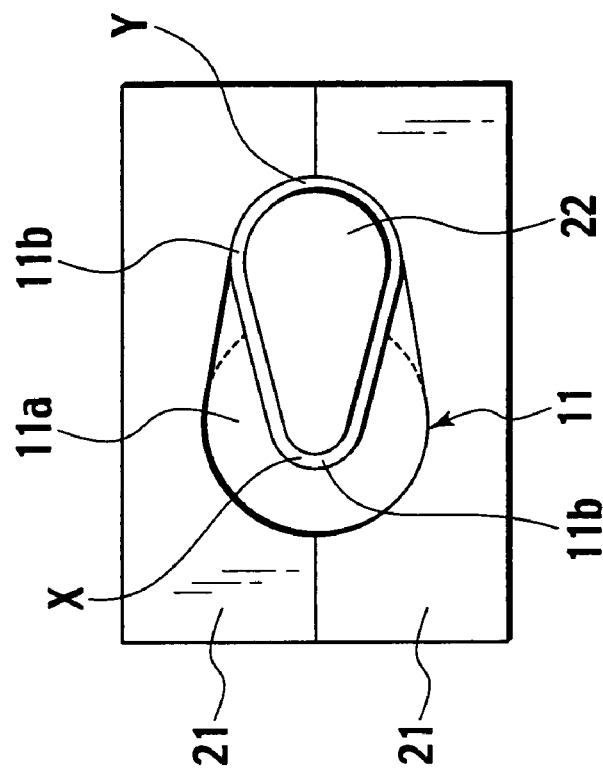
FIGS. 27A and 27B are explanatory diagrams illustrating the punching step of bending the open end portion of the outer pipe, in the method of making the double pipe forked part in the eighth embodiment.
Figure 27A:
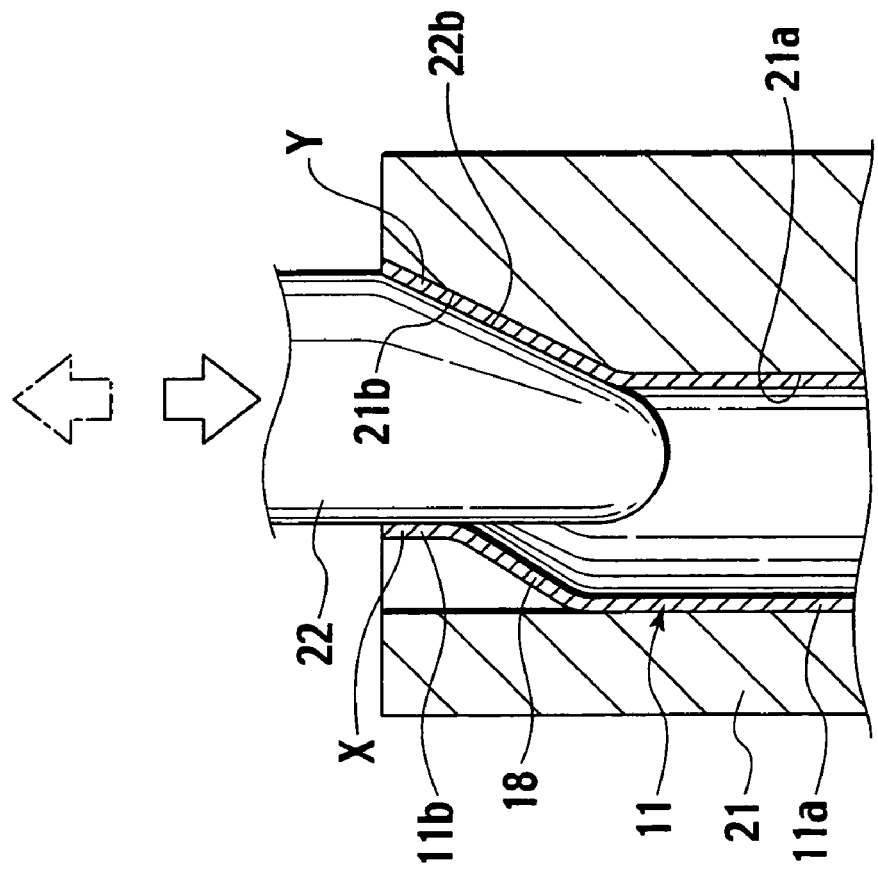

(i) First, as shown in FIGS. 26A to 27B, a punch 22 is press fitted into the unworked open end portion 11b of the linear outer pipe 11, to bend and decenter the open end portion 11b of the outer pipe 11 with respect to the main portion 11a of the outer pipe 11 (FIGS. 27A and 27B). A part X of the deformed open end portion 11b of the outer pipe 11 is formed in parallel with the main portion 11 of the outer pipe 11, decentered radially inward of the main portion 11a of the outer pipe 11 in a plane of projection along an extending direction of the main portion 11a of the outer pipe 11, as shown in FIGS. 27A and 27B. A part Y of the deformed open end portion 11b of the outer pipe 11 is inclined to expand outward with respect to the main portion 11a of the outer pipe 11.

The punch 22 is generally in the shape of a rod as a whole, provided with an inclined surface 22b at its distal end in an axial vertical cross-sectional view as shown in FIG. 27A, and having a deformed elliptical shape with a large-diameter half circle on one side and a small-diameter half circle on the other side in a diametrical cross-sectional view as shown in FIG. 27B. In the state before punching shown in FIGS. 26A and 26B, the punch 22 is located axially outside of the outer pipe 11 as shown in FIG. 26A, and the inclined surface 22b of the punch 22 overlaps the periphery of the outer pipe 11 when viewed in the axial direction of the outer pipe 11. In the figures, reference numeral 21 denotes a die. The die 21 includes a retaining hole 21a for holding the outer pipe 11. The die 21 also includes, at an open end portion of the retaining hole 21, an inclined surface 21b corresponding to the inclined surface 22b at the distal end of the punch 22. The inclined surface 21b of the die 21 supports the punch 22 when working the end portion of the outer pipe 11.

(ii) Then, as shown in FIGS. 28A to 29B, with two core bars 24, 25 inserted into the decentered open end portion 11b of the outer pipe 11, the outer pipe end portion 11b is radially pressed by faces 26b of a press die 26 into a spectacle shape in cross section. The core bar 24 corresponds to the inner pipe 12 in diameter, and the core bar 25 corresponds to the branch pipe 16 in diameter. As shown in FIGS. 28A and 28B, the core bar 24 corresponding to the inner pipe 12 is disposed in the part X decentered inward with respect to the main portion 11a of the outer pipe 11. The core bar 25 corresponding to the branch pipe 16 is disposed in the part Y bent and expanded outward with respect to the main portion 11a of the outer pipe 11, as shown in FIGS. 28A and 28B.

As shown in FIGS. 29A and 29B, the open end portion 11b deformed in a spectacle shape in cross section includes one cylindrical portion forming the inner pipe supporting portion 13 and the other cylindrical portion forming the branch pipe supporting portion 15. The inner pipe supporting portion 13 is located inward of the inner periphery of the main portion 11a of the outer pipe 11 in a plane of projection along an extending direction of the main portion 11a of the outer pipe 11.

Figure 30B:
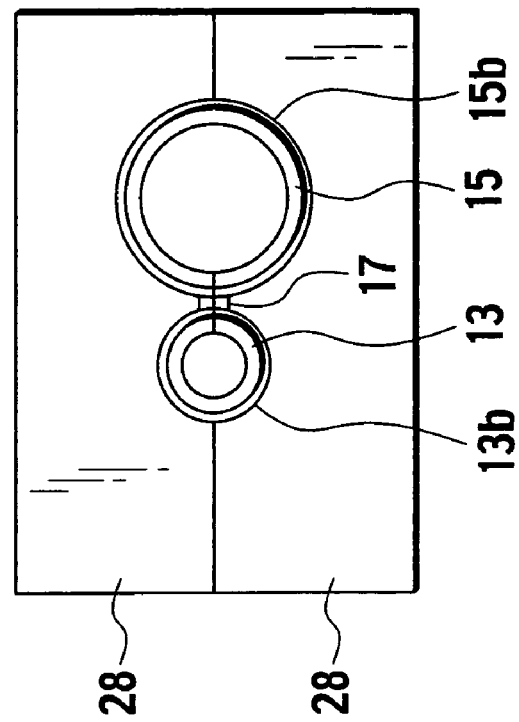
FIGS. 30A and 30B are explanatory diagrams illustrating a punching step of punching and expanding open ends of an inner pipe supporting portion and a branch pipe supporting portion, in the method of making the double pipe forked part in the eighth embodiment.
Figure 30A:
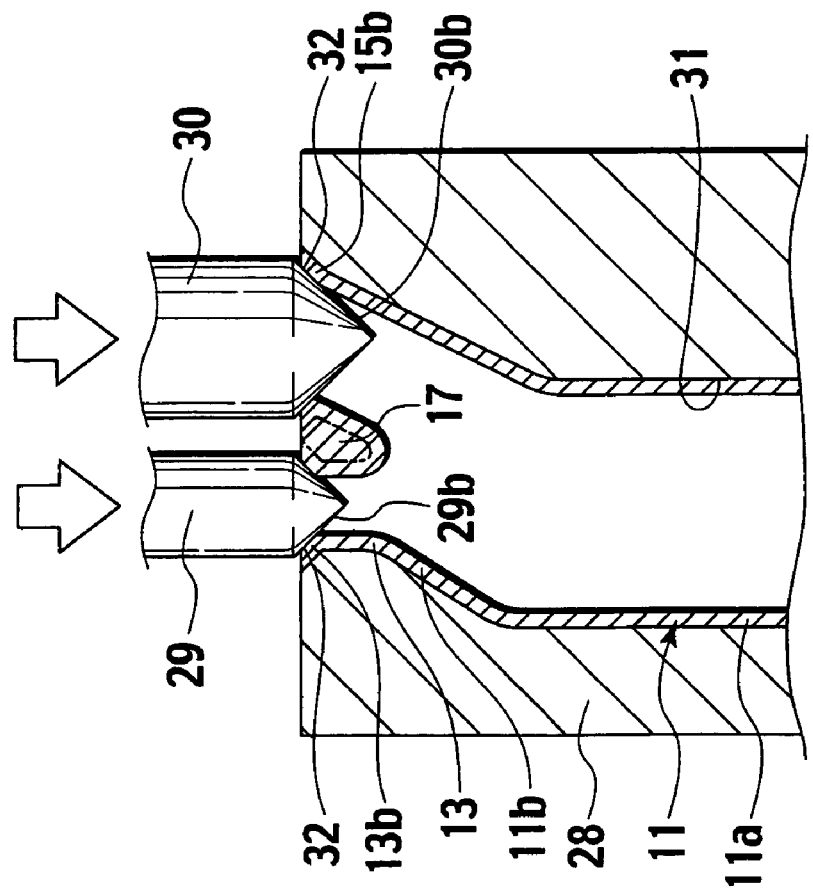

(iii) Then, as shown in FIGS. 30A and 30B, with the spectacle-shaped cross-section open end portion 11b held by a clamp 28, the open ends 13b, 15b of the inner pipe supporting portion 13 and the branch pipe supporting portion 15 are expanded in tapers by expanding punches 29, 30. The expanding punches 29, 30 in cylindrical shapes are formed at their distal ends with tapered inclined surfaces 29b, 30b. The clamp 28 is formed with tapered inclined surfaces 32 at an open end of an outer pipe retaining hole 31.

Figure 31A:
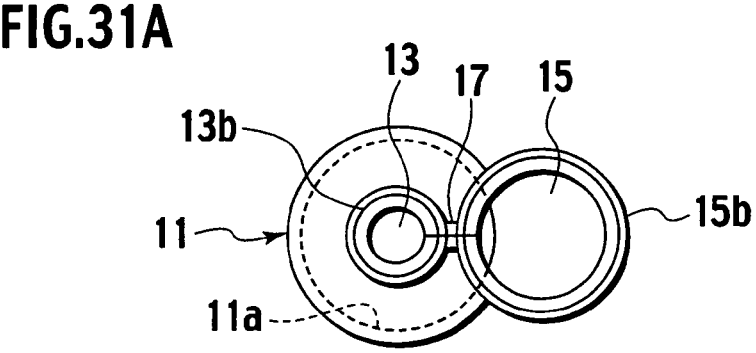
FIGS. 31A and 31B are explanatory diagrams illustrating the shape of the worked one end portion of the outer pipe, in the method of making the double pipe forked part in the eighth embodiment.
Figure 31B:
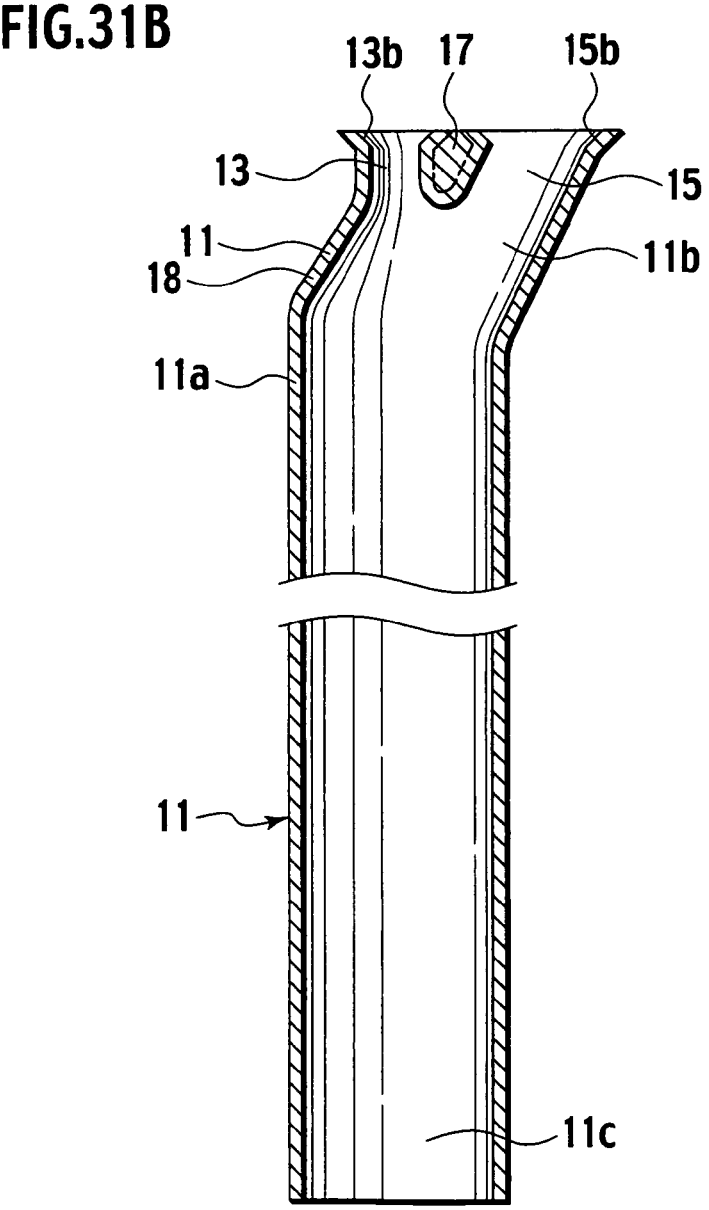
Figure 32:
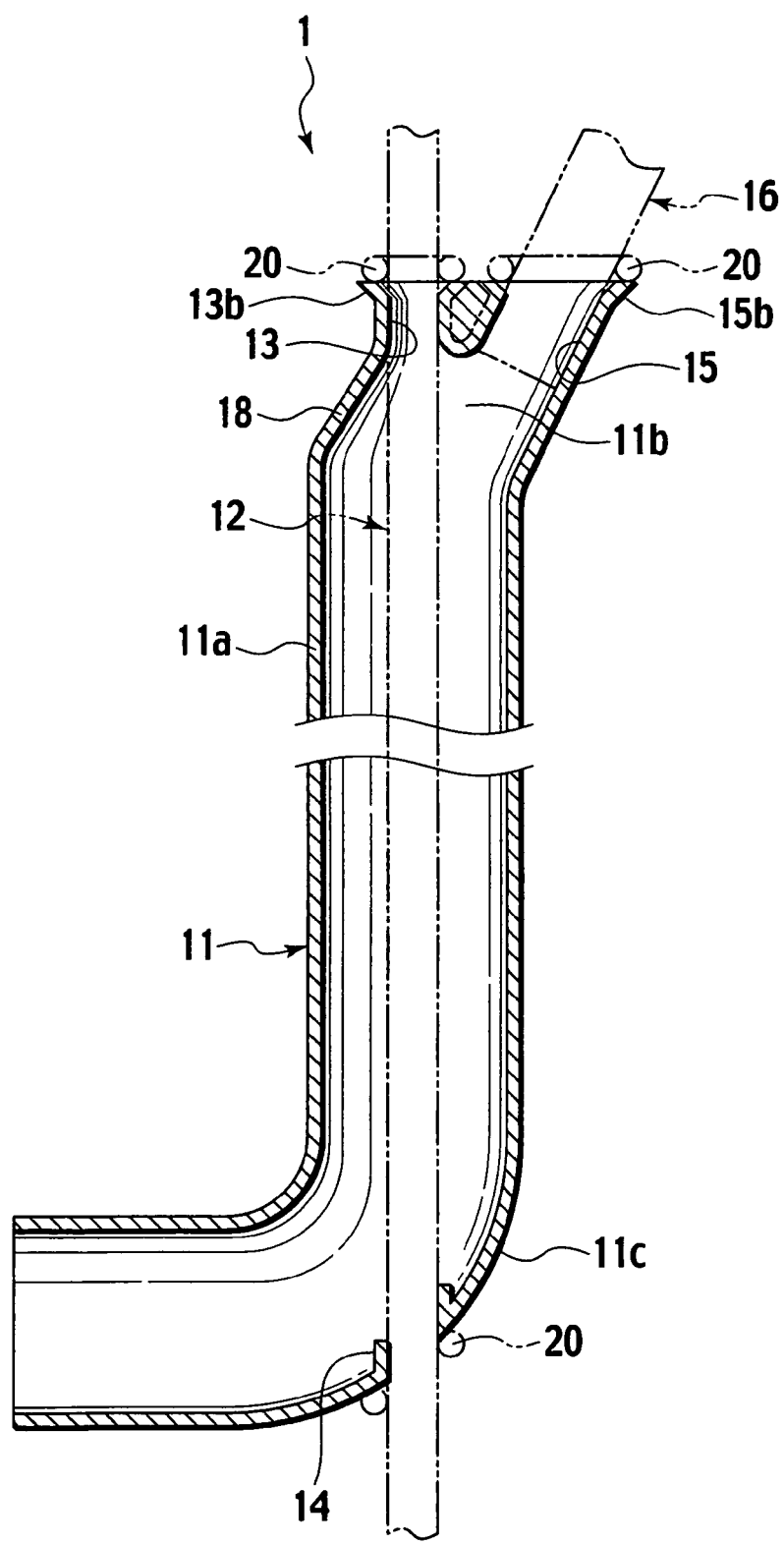
FIG. 32 is an explanatory longitudinal cross-sectional view of the outer pipe, illustrating a brazing process in the method of making the double pipe forked part in the eighth embodiment.

Through the steps (i), (ii) and (iii), the outer pipe 11 has a shape as shown in FIGS. 31A and 31B. Before or after the working of the end portion 11b at the first end of the outer pipe 11, the end portion 11c at the second end of the outer pipe 11 is bent in an L shape, and the tubular inner pipe supporting portion 14 is formed by drilling or burring in the L-shaped bent portion 11c (see FIG. 32). The inner pipe supporting portions 14 and 13 are provided in a straight line. In this embodiment, the inner pipe supporting portion 14 is projected inward of the outer pipe 11. Alternatively, in the present invention, the inner pipe supporting portion 14 may be projected outward of the outer pipe 11.

[Brazing Process]

As shown in FIG. 32, the linear inner pipe 12 is passed through the outer pipe 11 through the inner pipe supporting portions 13, 14 of the outer pipe 11, and the branch pipe 16 is inserted into the branch pipe supporting portion 15. The brazing materials 20 are placed on the ends of the supporting portions 13, 14 and 15 and heated to a predetermined temperature, thereby to fix the outer pipe 11, inner pipe 12 and branch pipe 16 together, and to hermetically seal the gaps in the supporting portions 13, 14 and 15 by the molten brazing materials 20. As a result, the double pipe 1 as shown in FIGS. 25 and 32 is formed.

The eighth embodiment has advantages as described below.

First, at the forked part 1b of the double pipe 1 in the eighth embodiment, the inner pipe supporting portion 13 and the branch pipe supporting portion 15 are provided separately with the joint portion 17 therebetween to form the open end portion 11b of the outer pipe 11 in a spectacle shape in cross section, and the branch pipe supporting portion 15 is inclined with respect to the inner pipe supporting portion 13. Since the inner pipe 12 and the branch pipe 16 are thus supported by the individual supporting portions 13, 15, the supporting stability is increased. Also, since the branch pipe supporting portion 15 is disposed at an inclination with respect to the inner pipe supporting portion 13, the two-layer joint portion 17 formed between the inner pipe supporting portion 13 and the branch pipe supporting portion 15 has an elongated joint margin d1 (see FIGS. 24 and 25), thereby improving the hermetic sealing at the forked part 1b of the double pipe 1.

Also, since the branch pipe supporting portion 15 is disposed at an inclination with respect to the inner pipe supporting portion 13, the inclination angle of the branch pipe 16 can be easily changed as desired for various piping layouts when compared to a conventional structure in which an inner pipe supporting portion and a branch pipe supporting portion are disposed adjacently in parallel.

Second, in the eighth embodiment, the extending direction of the inner pipe supporting portion 13 and the extending direction of the main portion 11a of the outer pipe 11 are set substantially in parallel, and the inner pipe 12 linearly passes through the outer pipe through the inner pipe supporting portion 13. Compared with a structure in which an inner pipe supporting portion is inclined with respect to a main portion of an outer pipe, the operation of passing the inner pipe 12 through the outer pipe 11 is facilitated.

Third, in the eighth embodiment, the inner pipe supporting portion 13 is located inward of the inner periphery of the main portion 11a of the outer pipe 11 in a plane of projection along an extending direction of the main portion 11a of the outer pipe 11. This arrangement ensures that the inner pipe 12 supported by the inner pipe supporting portion 13 of the outer pipe 11 keeps a distance from the inner periphery of the outer pipe 11, and can prevent, even when the double pipe 1 vibrates, intermittent contact between the inner pipe 12 and the outer pipe 11 that produces a chattering sound.

Fourth, in the eighth embodiment, the open ends 13b, 15b of the inner pipe supporting portion 13 and the branch pipe supporting portion 15 are expanded in flares. Thus, the brazing materials 20 are easily disposed on the open ends 13b, 15b of the supporting portions 13, 15. Consequently, the stability of the disposed brazing materials 20 in the brazing process is increased, resulting in a simplified production process.

Also, according to the method of making the forked part 1b of the double pipe 1 in the eighth embodiment, the end portion working process of the outer pipe 11 includes the punching step in which the punch 22 is press fitted into the unworked open end portion 11b of the outer pipe 11 to bend the open end portion 11b of the outer pipe 11 with respect to the main portion 11a, and the pressing step in which the bent open end portion 11b of the outer pipe 11 is radially pressed by the press die 26 into a spectacle shape in cross section. Thus, the open end portion 11b of the outer pipe 11 can be worked in a relatively small number of steps.

In addition, the production method in which the open end portion 11b of the outer pipe 11 is bent axially by the punch 22 allows the open end portion 11b of the outer pipe 11 to be expanded at the same time in the punching step. Thus, the inner pipe 12 and the branch pipe 16 supported by the open end portion 11b of the outer pipe 11 can be made larger in diameter. Alternatively, in the present invention, the open end portion 11b of the outer pipe 11 may be bent by another means as in a ninth embodiment shown in FIG. 33 or in a tenth embodiment shown in FIG. 34, for example.

Ninth Embodiment

Figure 33:
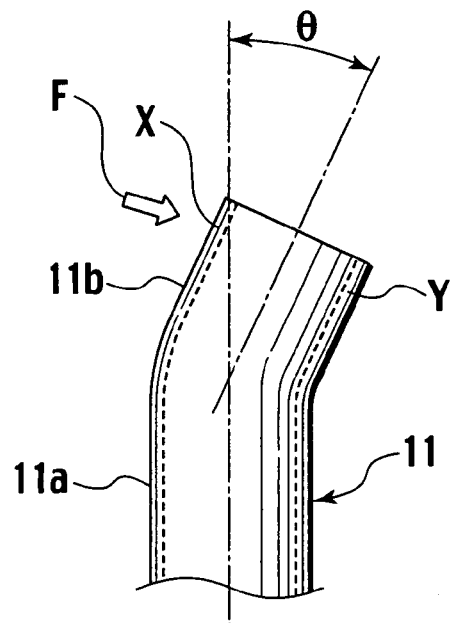
FIG. 33 is an explanatory diagram illustrating a bending step of bending and deforming an open end portion of an outer pipe by a bender, in a method of making a double pipe forked part in a ninth embodiment.

In a method of making a forked part in a ninth embodiment shown in FIG. 33, the step of bending an unworked open end portion 11b of an outer pipe 11 is performed by a bender not shown. Also in this case, the open end portion 11b of the outer pipe 11 can be worked in a relatively small number of steps. An existing bender can be used, resulting in production at relatively low costs.

Tenth Embodiment

Figure 34:
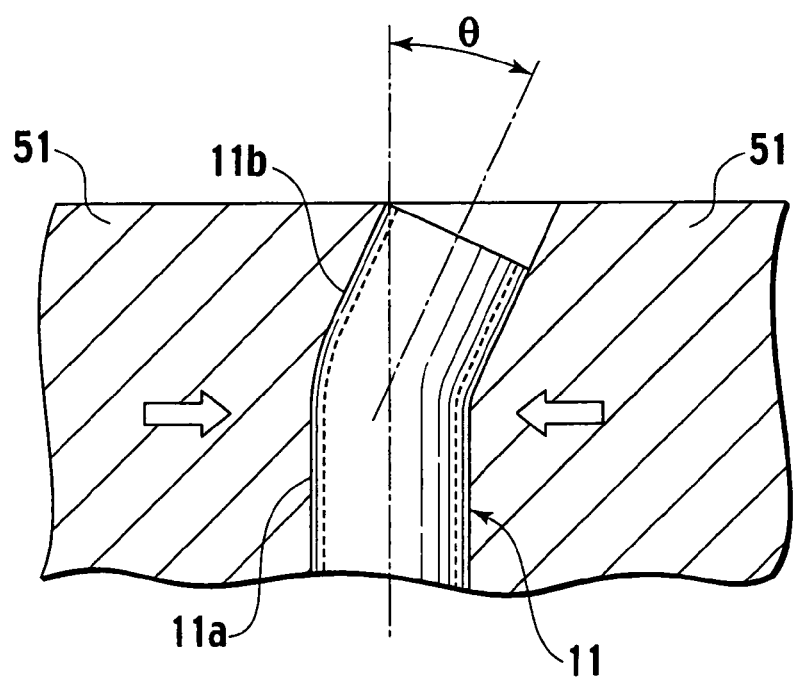
FIG. 34 is an explanatory diagram illustrating a bending step of bending and deforming an open end portion of an outer pipe by a press die, in a method of making a double pipe forked part in a tenth embodiment.
Figure 36B:
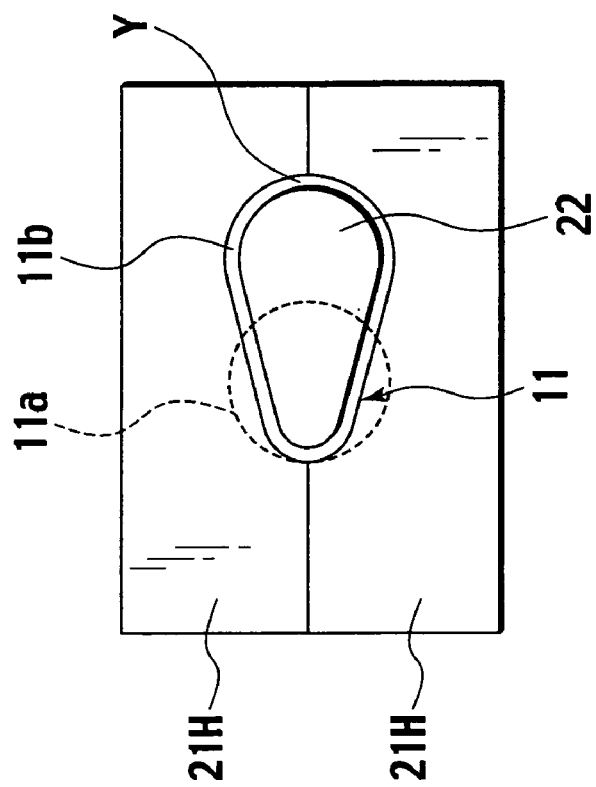
FIGS. 36A and 36B are explanatory diagrams illustrating the punching step of bending the open end portion of the outer pipe in the method of making the double pipe forked part in the eleventh embodiment.
Figure 36A:
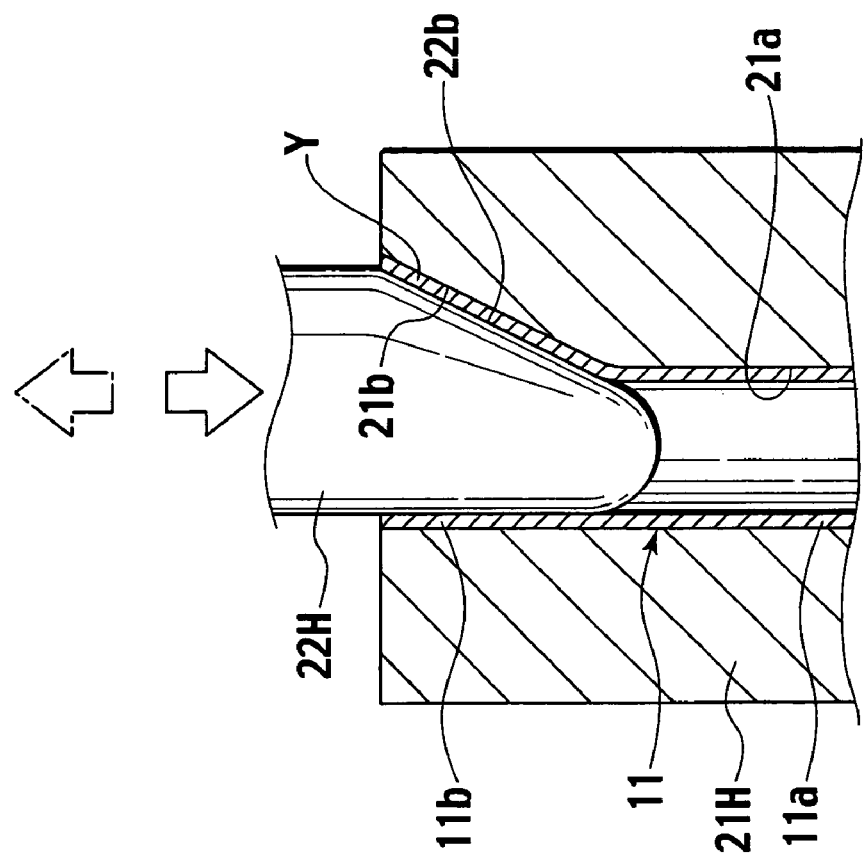
Figure 39A:
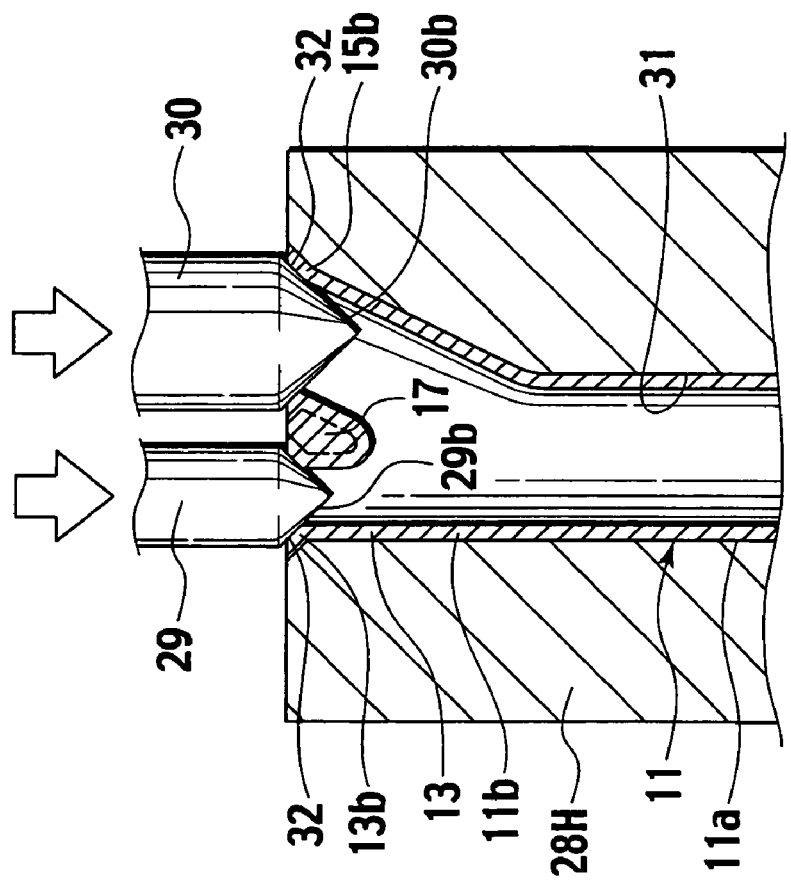
FIGS. 39A and 39B are explanatory diagrams illustrating a punching step of punching and expanding open ends of an inner pipe supporting portion and a branch pipe supporting portion, in the method of making the double pipe forked part in the eleventh embodiment.
Figure 39B:
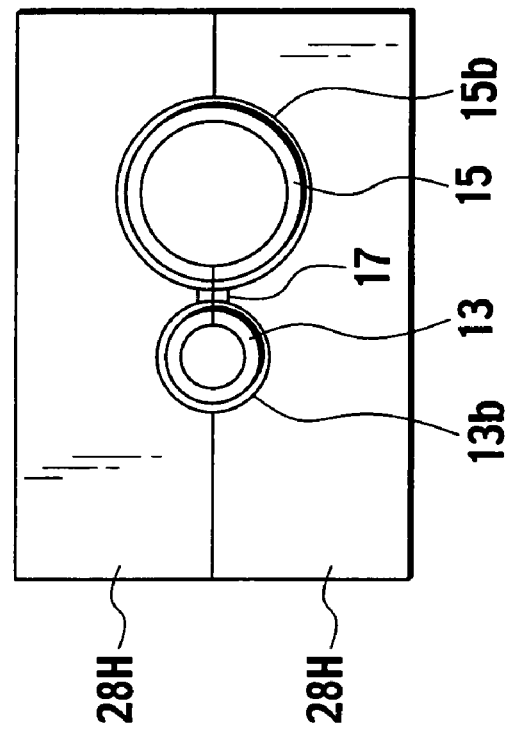
Figure 40A:
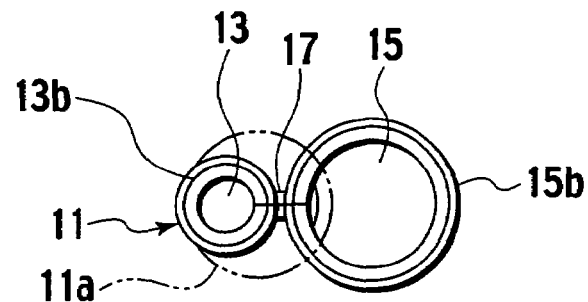
FIGS. 40A and 40B are explanatory diagrams illustrating the shape of the worked one end portion of the outer pipe, in the method of making the double pipe forked part in the eleventh embodiment.
Figure 40B:
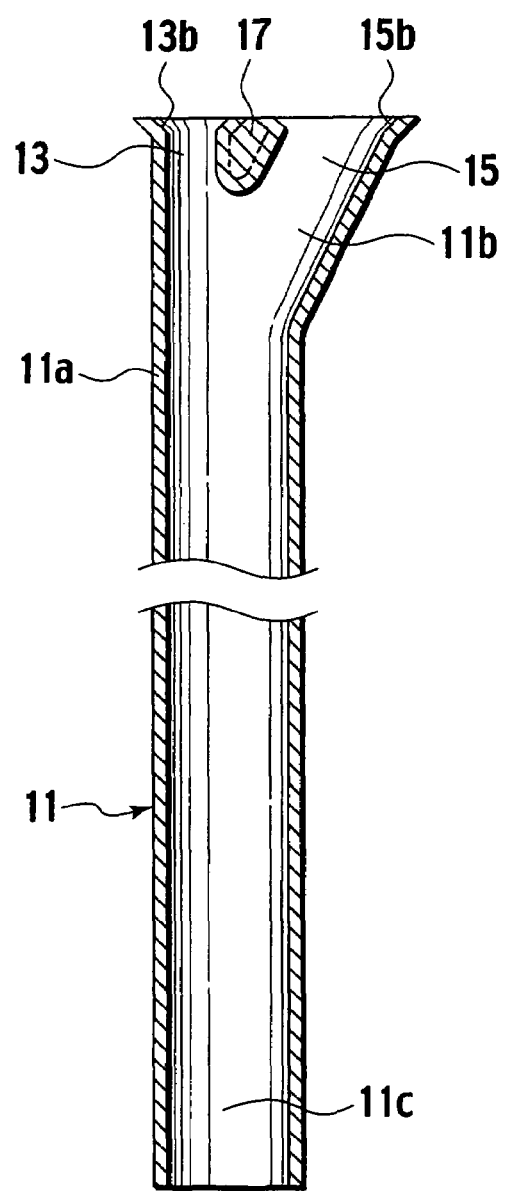

In a method of making a forked part in a tenth embodiment shown in FIG. 34, the step of bending an unworked open end portion 11b of an outer pipe 11 is performed by applying a radial force with a press die 51. Also in this case, the open end portion 11b of the outer pipe 11 can be worked in a relatively small number of steps.

Eleventh Embodiment

Figure 41:
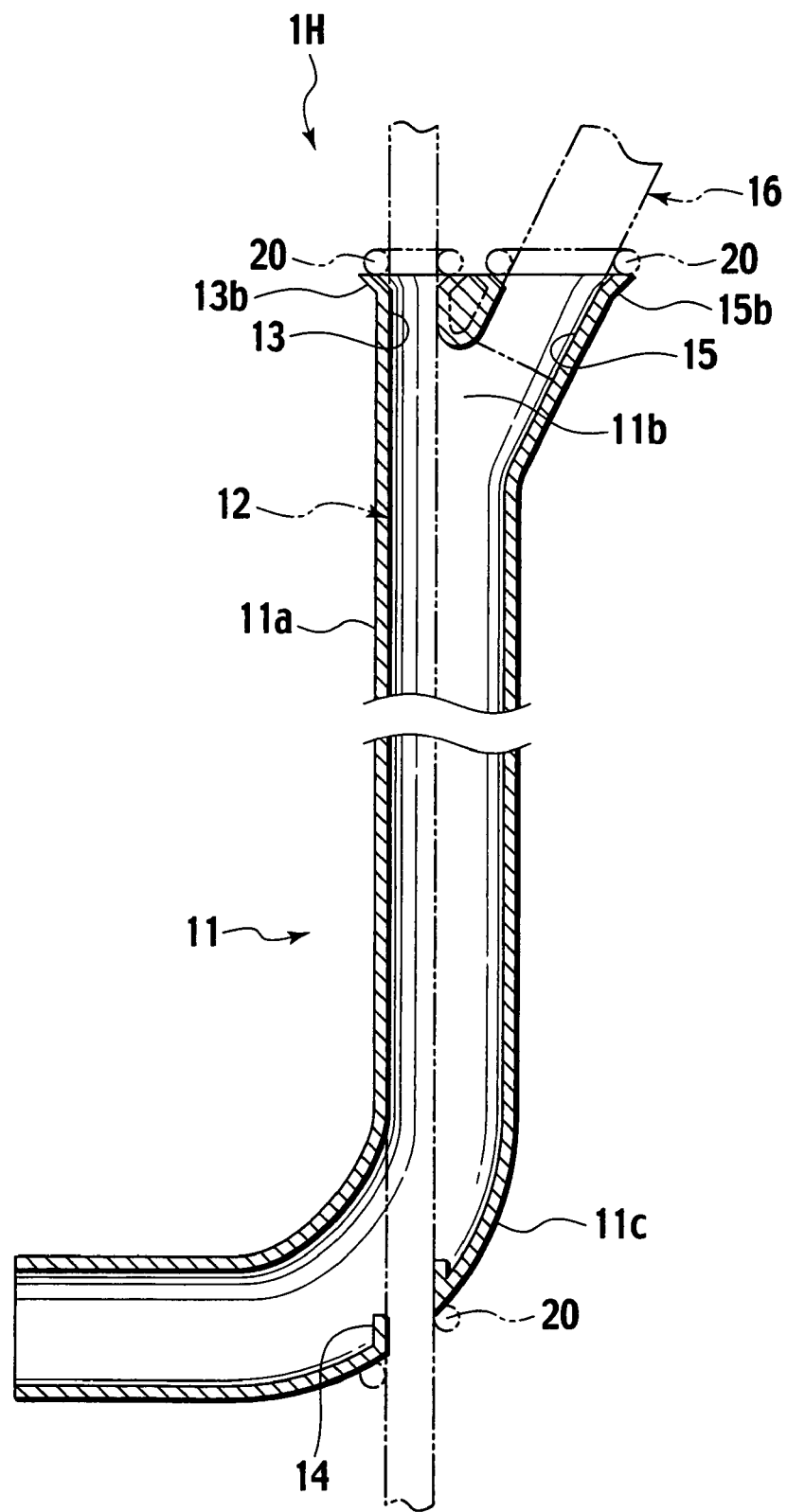
FIG. 41 is a longitudinal cross-sectional view of the outer pipe, showing a double pipe forked part structure in the eleventh embodiment and also illustrating a brazing process.

FIGS. 35A to 41 illustrate an eleventh embodiment. As shown in FIG. 41, a forked part 1b of a double pipe 1H in the eleventh embodiment does not include an inclined portion 18 (see FIG. 32) for preventing an inner pipe and an outer pipe from having contact and producing a chattering sound when the double pipe vibrates, which is different from the eighth embodiment. Specifically, in a method of making the forked part 1b of the double pipe 1H in the eleventh embodiment, in a punching step to bend an unworked open end portion 11b of an outer pipe 11 by a punch 22H, a part Y of the open end portion 11b of the outer pipe 11 is bent to expand outward of a main portion 11a of the outer pipe 11 as shown in FIGS. 35A to 36B, however another part of the open end portion 11b of the outer pipe 11 is not decentered inward of the main portion 11a of the outer pipe 11. FIGS. 35A to 40B are diagrams supplementarily explaining the method of making a forked part of a double pipe in the eleventh embodiment, which will not be described because it includes similar production steps to those in the eighth embodiment. FIGS. 35A and 35B correspond to FIGS. 26A and 26B in the eighth embodiment; FIGS. 36A and 36B correspond to FIGS. 27A and 27B in the eighth embodiment; FIGS. 37A and 37B correspond to FIGS. 28A and 28B in the eighth embodiment; FIGS. 38A and 38B correspond to FIGS. 29A and 29B in the eighth embodiment; FIGS. 39A and 39B correspond to FIGS. 30A and 30B in the eighth embodiment; FIGS. 40A and 40B correspond to FIGS. 31A and 31B in the eighth embodiment. Reference numeral 21H denotes a die; 22H, a punch; 26H, a press die; 28H, a clamp.

Twelfth Embodiment

Figure 42:
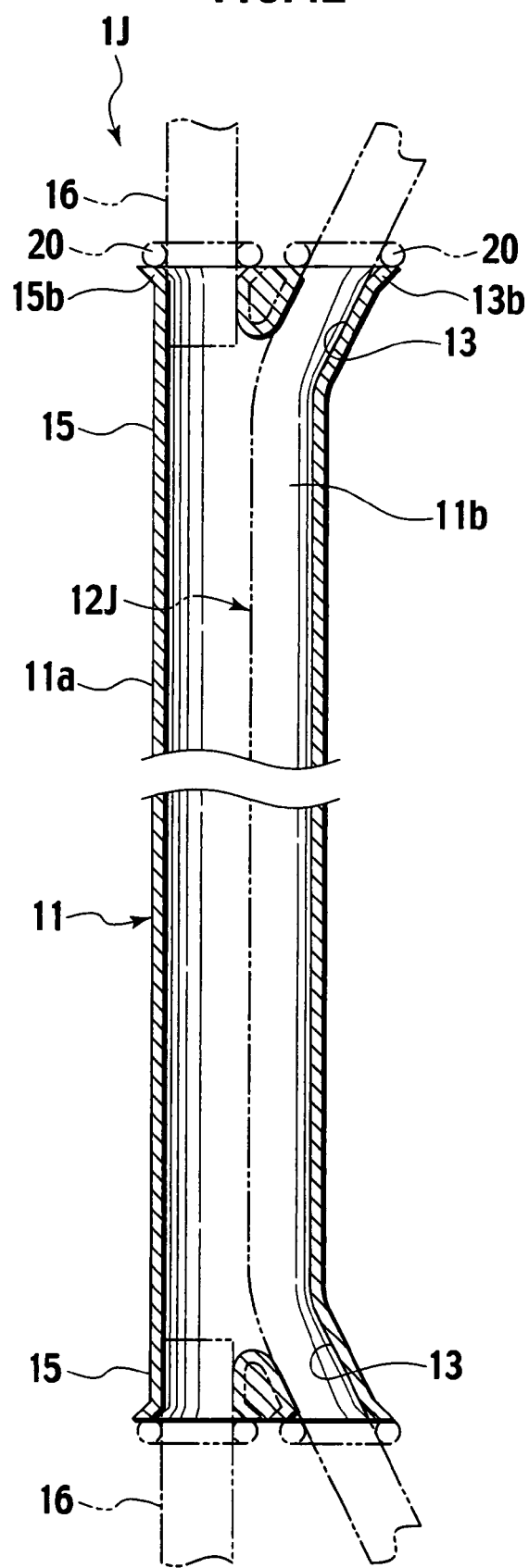
FIG. 42 is a longitudinal cross-sectional view of an outer pipe, showing a double pipe forked part structure in a twelfth embodiment and also illustrating a brazing process.

In the above-described eighth to eleventh embodiments, the linear inner pipe 12 passes through the outer pipe 11. In a double pipe 1J in a twelfth embodiment shown in FIG. 42, inner pipe supporting portions 13 are arranged at an inclination with respect to branch pipe supporting portions 15, and a curved inner pipe 12j passes through an outer pipe 11, for example.

In summary, the double pipe forked part structure in the eighth to twelfth embodiments is such that an inner pipe and a branch pipe are inserted into and brazed to an open end portion of an outer pipe which includes a tubular inner pipe supporting portion for supporting the inner pipe and a tubular branch pipe supporting portion for supporting the branch pipe. The inner pipe supporting portion and the branch pipe supporting portion are provided separately with a joint portion therebetween, so that the open end portion of the outer pipe is formed in a spectacle shape in cross section, and the branch pipe supporting portion is inclined with respect to the inner pipe supporting portion. Thus, the inner pipe and the branch pipe are supported by the individual supporting portions, thereby, resulting in increased supporting stability. Also, since the branch pipe supporting portion is disposed at an inclination with respect to the inner pipe supporting portion, the joint portion formed between the inner pipe supporting portion and the branch pipe supporting portion has an elongated joint margin, improving the hermetic sealing at the forked part of the double pipe.

Although the invention has been described above with reference to certain embodiments of the invention, the invention is not limited to the embodiments described above. Modification and variation of the embodiments can be made without departing from the sprit or scope of the appended claims. Therefore, the embodiments are only for an illustrative purpose and do not limit the invention.

What is claimed is:

1. A forked part structure of a double pipe, comprising:
    an outer pipe including a tubular main portion formed with an open end portion at an axial end of the main portion;
    an inner pipe, and;
    a branch pipe;
    wherein the open end portion of the outer pipe includes a substantially tubular inner pipe supporting portion to which the inner pipe is brazed, and a substantially tubular branch pipe supporting portion to which the branch pipe is brazed;
    wherein the inner pipe supporting portion is located inward of a main portion of the outer pipe along an extending direction of the main portion of the outer pipe; and
    wherein the inner pipe extends through the outer pipe via the inner pipe supporting portion and the main portion of the outer pipe.

2. A forked part structure of a double pipe as set forth in claim 1, wherein the inner pipe supporting portion and the branch pipe supporting portion are provided separately with a joint portion therebetween, forming the open end portion of the outer pipe substantially in a spectacle shape.

3. The forked part structure of a double pipe as set forth in claim 2, wherein:
    the joint portion is formed of two flat-plate portions that are laminated to one another.

4. A forked part structure of a double pipe as set forth in claim 1, wherein the inner pipe supporting portion and the branch pipe supporting portion are provided in a communicating manner, forming the open end portion of the outer pipe substantially in the shape of the figure eight.

5. A forked part structure of a double pipe as set forth in claim 1, wherein the inner pipe supporting portion and the branch pipe supporting portion are outwardly tapered at open ends thereof.

6. The forked part structure of a double pipe as set forth in claim 1, wherein:
    the inner pipe has no contact with the main portion of the outer pipe.

7. A method of making a forked part of a double pipe, comprising:
    working an open end portion of an outer pipe including a tubular main portion formed with the open end portion at an axial end of the main portion into one of a spectacle shape or a figure eight shape including a tubular inner pipe supporting portion and a tubular branch pipe supporting portion, in such a manner that the inner pipe supporting portion is located inward of a main portion of the outer pipe along an extending direction of the main portion of the outer pipe; and brazing joint portions of the outer pipe, an inner pipe and a branch pipe, with the inner pipe inserted into the outer pipe through the inner pipe supporting portion of the outer pipe, and the branch pipe inserted into the branch pipe supporting portion of the outer pipe; wherein the inner pipe extends through the outer pipe via the inner pipe supporting portion and the main portion of the outer pipe.

8. A method of making a forked part of a double pipe as set forth in claim 7, further comprising:

bending an unworked open end portion of the outer pipe by applying a radial force; and pressing the bent open end portion of the outer pipe radially by a press die into one of the spectacle shape or the figure eight shape including the inner pipe supporting portion and the branch pipe supporting portion.

9. A method of making a forked part of a double pipe as set forth in claim 8, further comprising:

after pressing, expanding open ends of the inner pipe supporting portion and the branch pipe supporting portion into tapered shapes.

10. A method of making a forked part of a double pipe as set forth in claim 7, further comprising:

pushing a bar-shaped punch provided with an inclined surface at a distal end thereof into an unworked open end portion of the outer pipe to decenter the open end portion of the outer pipe with respect to the main portion; and pressing the decentered open end portion of the outer pipe radially by a press die into one of the spectacle shape or the figure eight shape.

11. A method of making a forked part of a double pipe as set forth in claim 10, further comprising:

after pressing, expanding open ends of the inner pipe supporting portion and the branch pipe supporting portion into tapered shapes.

12. A forked part structure of a double pipe, comprising:

an outer pipe including a tubular main portion formed with an open end portion at an axial end of the main portion;

an inner pipe; and a branch pipe; wherein the open end portion of the outer pipe includes a tubular inner pipe supporting portion to which the inner pipe is brazed, and a tubular branch pipe supporting portion to which the branch pipe is brazed;

the inner pipe supporting portion and the branch pipe supporting portion are provided separately with a joint portion therebetween, forming the open end portion of the outer pipe in a spectacle shape;

the branch pipe supporting portion is inclined with respect to the inner pipe supporting portion; and the inner pipe extends through the outer pipe via the inner pipe supporting portion and the main portion of the outer pipe.

13. A forked part structure of a double pipe as set forth in claim 12, wherein:

an extending direction of the inner pipe supporting portion and an extending direction of a main portion of the outer pipe are substantially in parallel; and the inner pipe linearly passes through the outer pipe through the main portion and the inner pipe supporting portion.

14. A forked part structure of a double pipe as set forth in claim 12, wherein the inner pipe supporting portion is located inward of an inner periphery of the main portion of the outer pipe along the extending direction of the main portion of the outer pipe.

15. The forked part structure of a double pipe as set forth in claim 12, wherein:

the inner pipe has no contact with the main portion of the outer pipe.

16. The forked part structure of a double pipe as set forth in claim 10, wherein:

the joint portion is formed of two flat-plate-portions that are laminated to one another.

17. A method of making a forked part of a double pipe, comprising:

working an open end portion of an outer pipe including a tubular main portion formed with the open end portion at an axial end of the main portion into a spectacle shape including a tubular inner pipe supporting portion and a tubular branch pipe supporting portion, so that the branch pipe supporting portion is inclined with respect to the inner pipe supporting portion; and brazing joint portions of the outer pipe, an inner pipe and a branch pipe, with the inner pipe inserted into the outer pipe through the inner pipe supporting portion of the outer pipe, and the branch pipe inserted into the branch pipe supporting portion of the outer pipe; wherein the inner pipe extends through the outer pipe via the inner pipe supporting portion and the main portion of the outer pipe.

18. A method of making a forked part of a double pipe as set forth in claim 17, further comprising:

bending the unworked open end portion of the outer pipe by a bender; and pressing the bent open end portion of the outer pipe radially by a press die into the spectacle shape.

19. A method of making a forked part of a double pipe as set forth in claim 17, further comprising:

bending an unworked open end portion of the outer pipe by radially applying a force with a press die; and pressing the bent open end portion of the outer pipe radially by a press die into the spectacle shape.

20. A method of making a forked part of a double pipe as set forth in claim 17, further comprising:

pushing a bar-shaped punch provided with an inclined surface at a distal end thereof into the unworked open end portion of the outer pipe to incline at least a part of the open end portion of the outer pipe with respect to a main portion; and pressing the bent open end portion of the outer pipe radially by a press die into the spectacle shape.

* * * * *